(12) United States Patent
Wang et al.

(10) Patent No.: US 12,393,314 B1
(45) Date of Patent: Aug. 19, 2025

(54) TOUCH PANEL AND DISPLAY DEVICE

(71) Applicants: Wuhan Tianma MicroElectronics Co., Ltd. Shanghai Branch., Shanghai (CN); Wuhan Tianma Micro-Electronics Co., Ltd., Wuhan (CN)

(72) Inventors: Qingxia Wang, Shanghai (CN); Ruiqi Huang, Shanghai (CN); Peng Zhang, Shanghai (CN)

(73) Assignees: Wuhan Tianma MicroElectronics Co., Ltd. Shanghai Branch., Shanghai (CN); Wuhan Tianma Micro-Electronics Co., Ltd, Wuhan (CN)

( * ) Notice: Subject to any disclaimer, the term of this patent is extended or adjusted under 35 U.S.C. 154(b) by 0 days.

(21) Appl. No.: 18/782,785

(22) Filed: Jul. 24, 2024

(30) Foreign Application Priority Data

May 8, 2024 (CN) .......................... 202410566256.2

(51) Int. Cl.
*G06F 3/044* (2006.01)
(52) U.S. Cl.
CPC .. *G06F 3/0448* (2019.05); *G06F 2203/04112* (2013.01)

(58) Field of Classification Search
CPC ................... G06F 3/0448; G06F 2203/04112
USPC .......................................................... 345/174
See application file for complete search history.

(56) References Cited

U.S. PATENT DOCUMENTS

| | | | |
|---|---|---|---|
| 2014/0152579 A1* | 6/2014 | Frey ...................... | G06F 3/0416 345/173 |
| 2015/0009420 A1* | 1/2015 | Zhou ................... | G06F 3/04164 349/12 |
| 2018/0224964 A1* | 8/2018 | Church .................. | G06F 3/047 |
| 2022/0197418 A1* | 6/2022 | Liu ........................ | G06F 3/0446 |
| 2022/0253181 A1* | 8/2022 | Ouyang ................ | G06F 3/0446 |
| 2023/0214050 A1* | 7/2023 | Shin ....................... | G06F 3/0443 345/174 |

\* cited by examiner

*Primary Examiner* — Mark Edwards
(74) *Attorney, Agent, or Firm* — Anova Law Group, PLLC

(57) ABSTRACT

A touch panel and a display device are provided. The touch panel includes a plurality of touch electrodes arranged in an array. The plurality of touch electrodes has a metal mesh structure. One touch electrode of the plurality of touch electrodes includes a main electrode and a plurality of branch electrodes. The plurality of branch electrodes is separated from each other and all electrically connected to the main electrode.

18 Claims, 26 Drawing Sheets

TOUCH PANEL AND DISPLAY DEVICE

CROSS-REFERENCE TO RELATED APPLICATION

This application claims the priority of Chinese Patent Application No. 202410566256.2, filed on May 8, 2024, the content of which is incorporated herein by reference in its entirety.

TECHNICAL FIELD

The present disclosure generally relates to the field of display technology and, more particularly, relates to a touch panel and a display device.

BACKGROUND

With the development of the display technology, more and more display panels are integrated with touch functions. The application range of touch screens is very broad, and the main products include mobile terminals such as touch-screen mobile phones and laptops, as well as human-machine display interfaces in the industrial automation.

To realize the touch function of a display panel, touch electrodes are usually set inside the display panel. When the touch electrodes are made of metal mesh, visual brightness difference between the inside of the touch electrodes and the adjacent touch electrodes will become more obvious.

SUMMARY

One aspect of the present disclosure provides a touch panel. The touch panel includes a plurality of touch electrodes arranged in an array. The plurality of touch electrodes has a metal mesh structure. One touch electrode of the plurality of touch electrodes includes a main electrode and a plurality of branch electrodes. The plurality of branch electrodes is separated from each other and all electrically connected to the main electrode.

One aspect of the present disclosure provides a display device. The display device includes a touch panel. The touch panel includes a plurality of touch electrodes arranged in an array. The plurality of touch electrodes has a metal mesh structure. One touch electrode of the plurality of touch electrodes includes a main electrode and a plurality of branch electrodes. The plurality of branch electrodes is separated from each other and all electrically connected to the main electrode.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
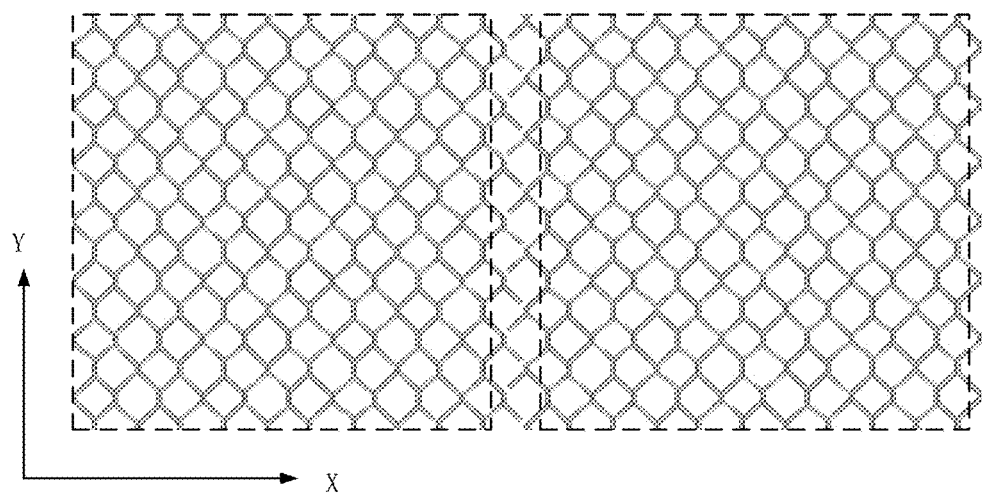
FIG. 1 illustrates a local structure of a touch panel.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In the present disclosure, relational terms such as first and second are only used to distinguish one entity or operation from another entity or operation, and do not necessarily require or imply any such actual relationship between these entities or operations or order. Moreover, the terms "including", "comprising" or any other variants thereof are intended to cover non-exclusive inclusion, such that a process, method, article, or device that includes a series of elements includes not only those elements, but also those that are not explicitly listed or also include elements inherent to this process, method, article or equipment. If there are no more restrictions, the elements defined by the sentence "including . . . " do not exclude the existence of other same elements in the process, method, article, or equipment that includes the elements.

It should be understood that when describing the structure of a component, when a layer or region is referred to as being "on" or "above" another layer or another region, the layer or region may be directly on the other layer or region, or indirectly on the other layer or region, for example, layers/components between the layer or region and another layer or another region. And, for example, when the component is reversed, the layer or region may be "below" or "under" the other layer or region. In the present disclosure, the term "electrical connection" refers to that two components are directly electrically connected with each other, or the two components are electrically connected via one or more other components.

To implement a touch function, a display device needs to be provided with a touch panel, and the touch panel senses touch instructions sent by a user to implement the touch function. The touch panel includes a plurality of touch electrodes, and the plurality of touch electrodes are distributed at different positions of the touch panel. Generally, the plurality of touch electrodes is arranged in a block structure, but the block structure will block pixels and affect light emission of the pixels. Also, the plurality of touch electrodes is made of transparent metal oxide materials, and the resistance is relatively large. Therefore, a metal mesh is used to form the plurality of touch electrodes. Hollow mesh holes of the metal mesh are able to expose the pixels. Therefore, the touch electrodes' blocking of the light emitted by the pixels is reduced, the light extraction efficiency is improved, and the cost is low. Also, the optical and electrical properties are not significantly reduced as the size of the touch panel increases. At the same time, since metal has a certain degree of bending resistance, the metal mesh can be applied to flexible display panels. Therefore, in the field of touch panels, metal meshes are widely used to form the touch electrodes.

As shown in FIG. 1 illustrating a local structure of a touch panel in existing technologies, the dotted boxes are a partial structure of the touch electrodes. The touch electrodes have independent structures. The two dotted boxes represent two adjacent and independent touch electrodes. Since adjacent touch electrodes need to be insulated, there is a gap between two adjacent touch electrodes. The metal mesh is disconnected (or no metal is provided) at the gap, while the metal mesh inside the touch electrodes is not disconnected. Therefore, the degree of reflection of external light inside the touch electrodes is different from the degree of reflection of external light at the gap between adjacent touch electrodes, resulting in a more obvious visual difference. Human eyes is able to recognize the etched lines on the touch panel, affecting the uniformity of the display panel.

Figure 2:
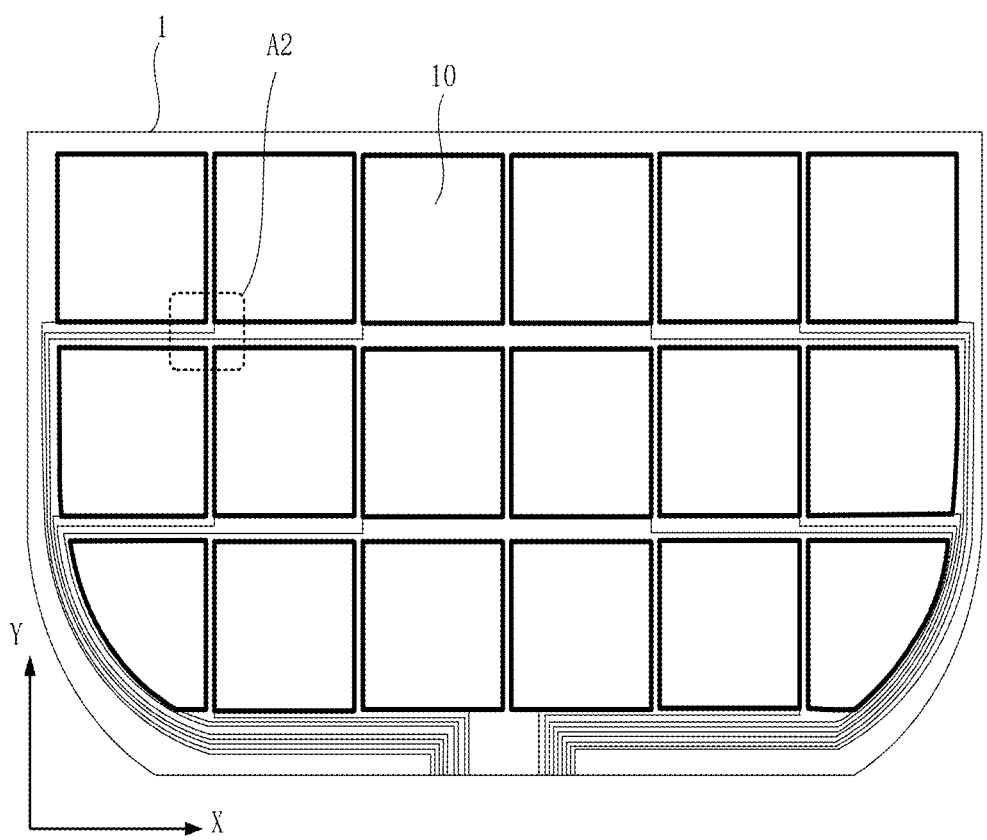
FIG. 2 illustrates a local structure of an exemplary touch panel consistent with various disclosed embodiments in the present disclosure.
Figure 3:
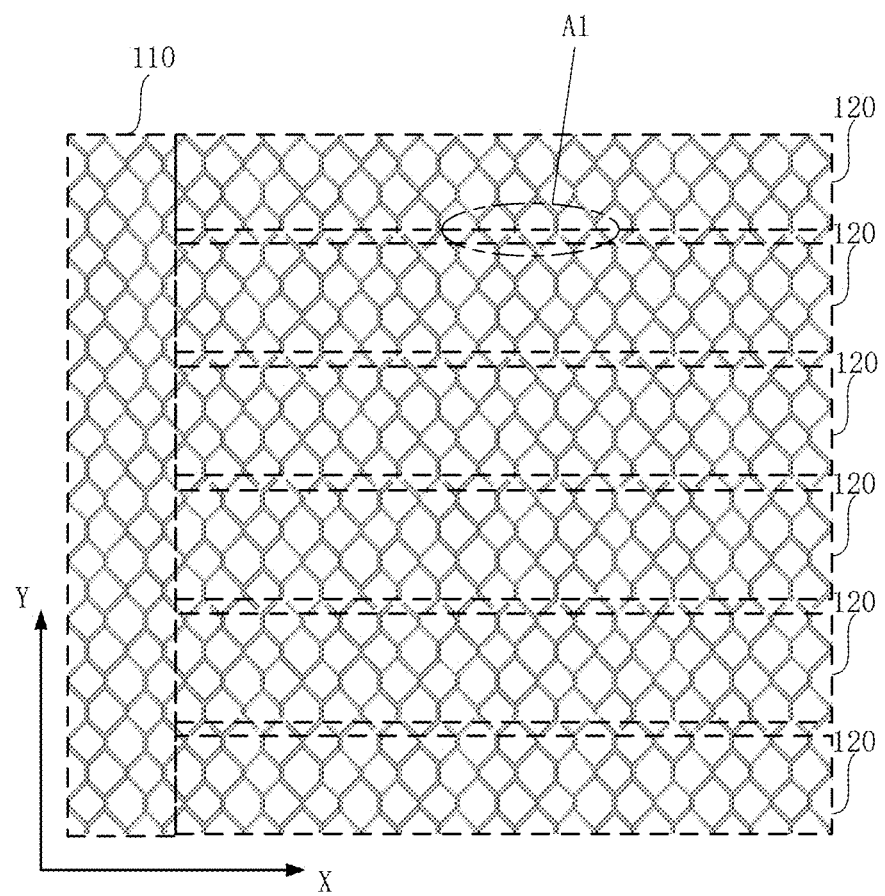
FIG. 3 illustrates an exemplary type of touch electrodes consistent with various disclosed embodiments in the present disclosure.

The present disclosure provides a touch panel, to at least partially alleviate the above problems. FIG. 2 illustrates a local structure of an exemplary touch panel provided by the present disclosure and FIG. 3 illustrates an exemplary touch electrode according to the present disclosure. As shown in FIG. 2 and FIG. 3, in one embodiment, the touch panel 1 may include a plurality of touch electrodes 10 arranged in an array. Each touch electrode 10 of the plurality of touch electrodes 10 may include metal mesh lines. Each touch electrode 10 of the plurality of touch electrodes 10 may include a main electrode 110 and a plurality of branch electrodes 120. The plurality of branch electrodes 120 may be separated from each other and all electrically connected to the main electrode 110.

The touch panel 1 may include the plurality of touch electrodes 10 arranged in an array. In one embodiment, the plurality of touch electrodes 10 may be arranged in an array along an X direction (such as an extending direction of scan lines) and a Y direction (such as an extending direction of data lines). The plurality of touch electrodes 10 may be all made of metal mesh lines. In one embodiment shown in FIG. 3, one touch electrode 10 of the plurality of touch electrodes 10 may include one main electrode 110 and six branch electrodes 120 separated from each other. Each branch electrode 120 may be electrically connected to the main electrode 110, and the main electrode and each branch electrode 120 may perform touch sensing. The touch electrode shown in FIG. 3 is used as an example only to illustrate the present disclosure. In various embodiments, the shapes, number, and positions of main electrodes 110 are not limited, and may be set according to actual needs.

In existing technologies, metal mesh lines inside one touch electrode 10 are all connected to each other. Since insulation is required between adjacent touch electrodes 10, there are gaps between adjacent touch electrodes 10, and the metal mesh lines are disconnected (or no metal is provided)

at the gaps to achieve the purpose of insulation. First, the areas where the metal mesh lines are not provided at the gaps and the area where the metal mesh lines are provided inside the touch electrodes 10 reflect the external light with different degrees, which will produce a certain visual difference and affect the uniformity of the display panel. Secondly, the positions where the metal mesh lines are disconnected at the gaps needs to be formed by etching. During the etching process, the metal mesh lines at the fractures have inclined surfaces with certain angles, while the metal mesh lines inside the touch electrodes 10 are all planar structures. Since the inclined surfaces of the fractures of the metal mesh lines and the planar parts of the metal mesh lines reflect the external light with different degrees, a certain visual difference will also be produced, thereby affecting the uniformity of the display panel. Further, there is also a certain degree of difference in the degree of reflection of light between the area where the metal mesh lines are not provided at the gaps and the area where the fractures are provided at the gaps, which affects the visual effect. Therefore, the touch electrode 10 provided in the embodiment of the present disclosure may include the main electrode 110 and the plurality of branch electrodes 120, and the plurality of the branch electrodes 120 may be separated from each other with gaps therebetween. A plurality of fractures may be formed by etching at the gaps between the plurality of branch electrodes 120, such that there may be interconnected metal mesh lines, areas where metal mesh lines are not set, and inclined surfaces of the fractures of the metal mesh lines, inside the touch electrode 10.

By setting the fractures inside the touch electrode 10 as a whole, it may be ensured that the structure of the metal mesh line is the same within the unit area, the structures at the positions where the metal mesh lines are not set are also roughly the same, and the structures of the fracture inclined surfaces generated by etching the fractures on the metal mesh lines are also roughly the same. Therefore, the degree of reflection of external light within the unit area of the touch electrode 10 may be basically the same, and the degree of reflection of external light at the gaps between adjacent touch electrodes 10 may be closer. By reducing the difference in light reflection inside the touch electrode 10 and the gaps between the adjacent touch electrodes 10, the visual display difference between the inside of the touch electrode 10 and the gaps of the adjacent touch electrodes 10 may be reduced, improving the human eyes' recognizability of the etched lines in the touch panel, and improving the uniformity of the display panel. The term "same" in the present disclosure does not mean completely the same, but the same within a certain range.

Each branch electrode 120 may be electrically connected to the main electrode 110 to ensure that the metal mesh lines inside the entire touch electrode 10 are connected, to accurately sense the touch signal and minimize the occurrence of floating electrodes. The above structure provided by the present embodiment may electrically connect each branch electrode 120 to the main electrode 110, improving the degree of light reflection inside the touch electrode 10 and the display effect of the display panel. In some other embodiments, virtual electrodes may also be set in the touch panel 1 to improve the display effect, etc. The specific content will be explained in the subsequent embodiments.

Figure 4:
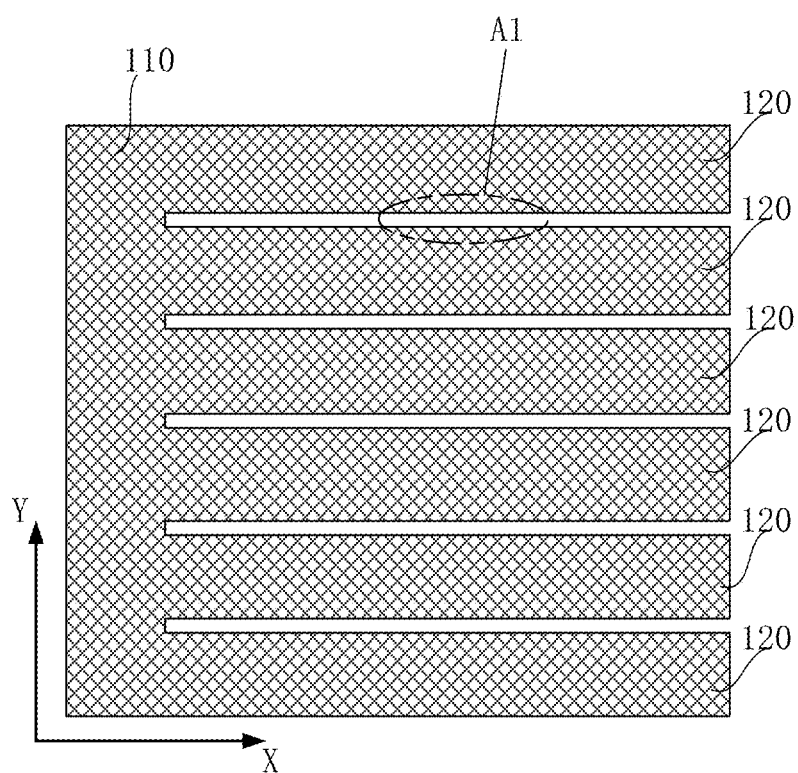
FIG. 4 illustrates another exemplary type of touch electrodes consistent with various disclosed embodiments in the present disclosure.

FIG. 4 is an equivalent schematic diagram of FIG. 3. As shown in FIG. 4, the A1 regions are separation areas for adjacent branch electrodes 120. There may be a plurality of fractures in one A1 region, which are represented by specific fracture structures in FIG. 3 and by a flush gap in FIG. 4. It should be understood that the flush gap inside the touch electrode 10 in FIG. 4 represents the positions where the fractures are set, and the extending direction of the gap is equivalent to the extending direction formed by the arrangement of the plurality of fractures. The gaps in FIG. 4 are only used to illustrate the approximate positions and extending directions of the fractures, and do not mean that the fractures need to be the flush shapes shown in FIG. 4. The specific fracture edge shapes may be set according to actual needs and process capabilities. The above embodiment is only for exemplary explanation. The flush gaps that appear in the subsequent figures have the same meaning as here, and may be understood by reference to this. The gaps may also represent the positions of the fractures, and the flush shape is only for illustration, and will not be explained later.

The present disclosure does not impose any limitations on the number, shapes, positions, length, etc. of main electrodes. Each touch electrode may include at least one main electrode, and the number of main electrodes may be set according to actual needs. Also, there are no restrictions on the specific number, shapes, positions, etc. of the branch electrodes, which may be set according to actual needs, ensuring that there are branch electrodes separated from each other in the touch electrode. In some optional embodiments, the gap between adjacent touch electrodes may be less than 300 µm, to ensure the touch effect of the touch panel, which may be designed according to actual needs.

In the touch panel provided by the present disclosure, the touch panel may include the plurality of touch electrodes arranged in an array. Adjacent touch electrodes may be separated from each other, and the plurality of branch electrodes in one touch electrode may be also separated from each other, thereby reducing the difference in the degree of light reflection between the inside of the touch electrodes and the gaps between adjacent touch electrodes, reducing the brightness difference at different parts of the display panel, improving the human eyes' recognizability of the etched lines on the touch panel, and improving the uniformity of the display panel.

Figure 5:
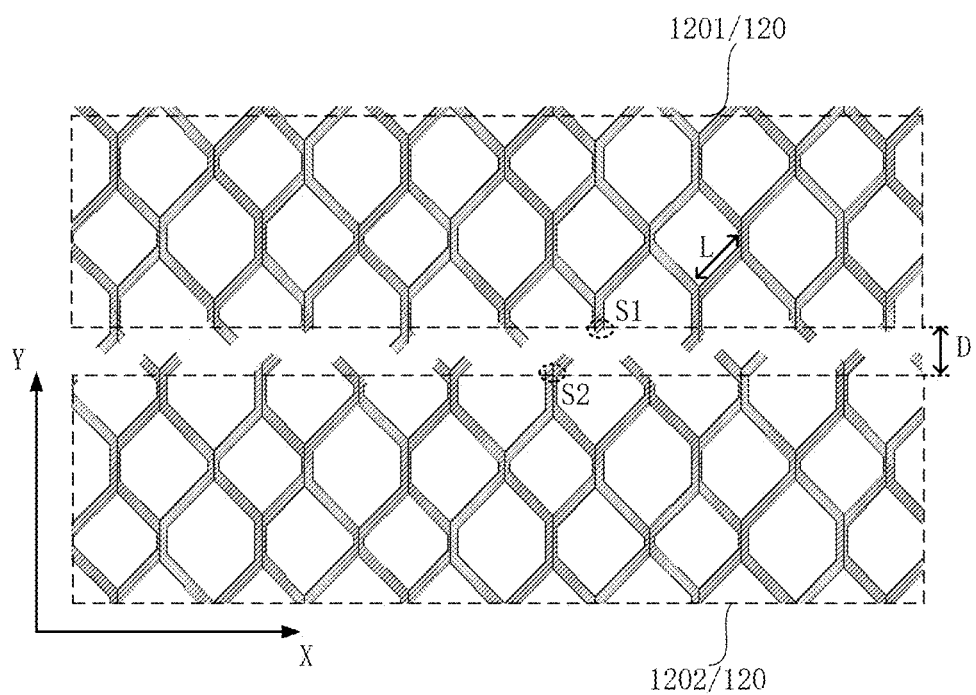
FIG. 5 illustrates a local structure of an exemplary type of touch electrodes consistent with various disclosed embodiments in the present disclosure.

In some embodiments shown in FIG. 5 which illustrates a local structure of a touch electrode, a minimum distance between two adjacent parallel metal mesh lines is L, and a distance between adjacent branch electrodes 120 in the touch electrode is D, where D<L.

For description purposes only, FIG. 5 only shows a partial structure of the touch electrode, including two adjacent branch electrodes 120. Since the metal meshes at various positions are different and the size of the metal meshes is not completely consistent, the distance between two adjacent parallel metal mesh lines may not be fixed. The minimum distance between two adjacent parallel metal mesh lines may be L and there may be no other metal mesh lines between two adjacent parallel metal mesh lines. Adjacent branch electrodes 120 in the touch electrode may be separated from each other, that is, there may be a certain distance between adjacent branch electrodes 120, and the distance between adjacent branch electrodes 120 in the touch electrode may be D, wherein D<L. When the distance D between adjacent branch electrodes 120 in the touch electrode is less than the minimum distance L between two adjacent parallel metal mesh lines, there may be no other metal mesh lines between the two adjacent branch electrodes 120, and there also may be no space to accommodate other metal mesh lines, thereby satisfying the application scenario where there are no other structures between adjacent branch electrodes 120 and increasing the effective area of the touch electrode.

For example, the two adjacent branch electrodes 120 may be one branch electrode 1201 and one branch electrode 1202, and the distance D between the branch electrode 1201 and the branch electrode 1202 is shown in FIG. 5. The touch electrode may include a plurality of metal mesh lines, and there may be an intersection between two metal mesh lines. Therefore, an intersection formed by two metal mesh lines closest to the fracture on the side in the branch electrode 1201 may be used as a first reference point S1, and an intersection formed by two metal mesh lines closest to the fracture on the side in the branch electrode 1202 may be used as a second reference point S2. The plurality of touch electrodes 10 may be arranged in an array along the X direction (such as the extending direction of the scan lines) and the Y direction (such as the extending direction of the data lines). The distance between the first reference point S1 and the second reference point S2 along the Y direction may be the distance D between the branch electrode 1201 and the branch electrode 1202. That is, the distance between the intersection formed by the two metal mesh lines closest to the side fracture on one side of the gap and the intersection formed by the two metal mesh lines closest to the side fracture on the other side of the gap along the Y direction may be the distance D between two adjacent branch electrodes.

The values of D and L are not limited in the present disclosure. When forming the touch panel, D may meet the minimum process capability, and L may match the size of the pixel opening distance (PDL gap).

In some other embodiments, the first reference point and the second reference point may also be defined in other ways to determine the distance between two adjacent branch electrodes, but should be unified. The above embodiment is only an example for description.

Figure 6:
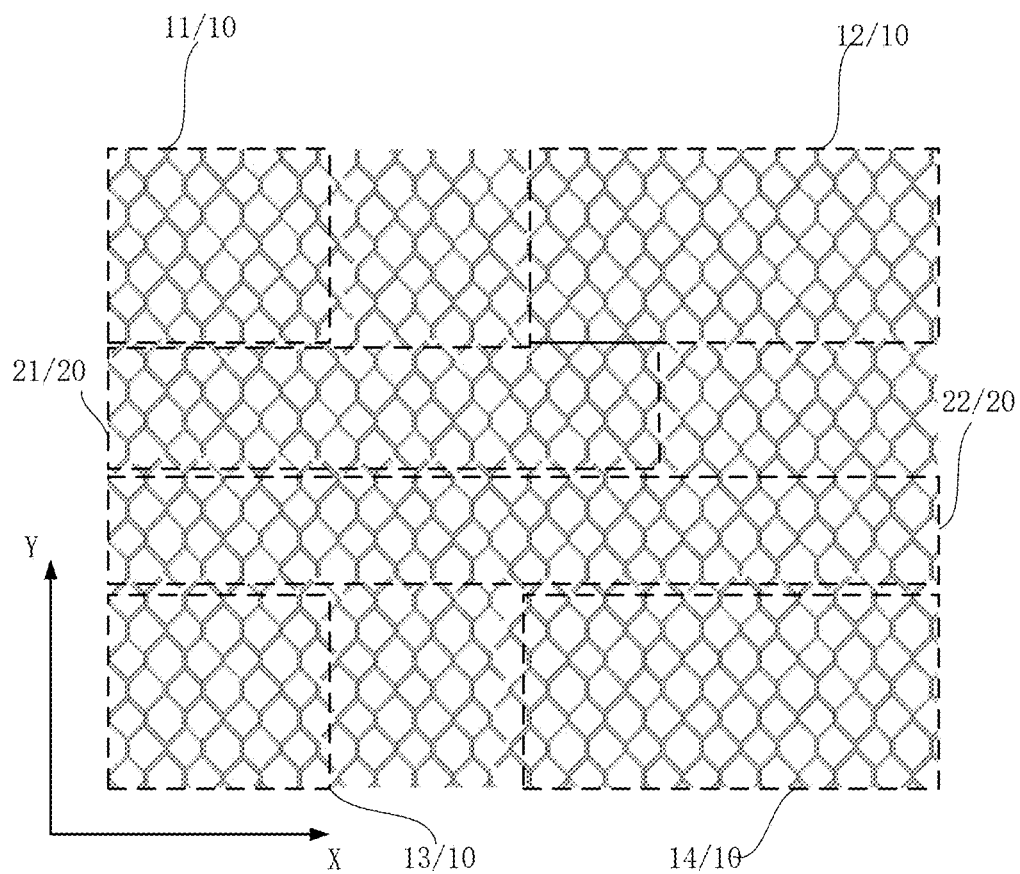
FIG. 6 illustrates an enlarged view of an A2 region in FIG. 2, consistent with various disclosed embodiments in the present disclosure.

In some embodiments shown in FIG. 2 and FIG. 6 which illustrates an enlarged view of the A2 region in FIG. 2, the touch panel 1 may further include touch leads 20, and the touch leads 20 may be disposed between adjacent touch electrodes 10. Te touch leads 20 may include metal mesh lines; and the touch leads 20 may be electrically connected to the touch electrodes 10 one by one.

For example, there may be gaps between touch electrodes 10 adjacent along the X direction, and there may be gaps between touch electrodes 10 adjacent along the Y direction. The touch leads 20 may be disposed in the gaps between touch electrodes 10 adjacent along the Y direction, and each touch electrode 10 may be electrically connected to a control chip IC in the non-touch area through one corresponding touch lead. FIG. 6 shows two touch leads 20 including a touch lead 21 and a touch lead 22, and four touch electrodes 10 including a touch electrode 11, a touch electrode 12, a touch electrode 13, and a touch electrode 14. Only a partial structure of the two touch leads 20 and the four touch electrodes 10 are shown. The touch lead 21 may be electrically connected to the touch electrode 12, and may be insulated from the other touch electrodes 10. The touch lead 22 may be electrically connected to one touch electrode 10 (not shown in FIG. 6, and the structure of FIG. 2 can be referred to) corresponding to the touch lead 22. Since one touch electrode 10 is electrically connected to one touch lead 20 corresponding to the touch electrode 10 and insulated from other touch leads 20, and the touch electrode 10 and the touch lead 20 both include metal mesh lines, it may be necessary to separate the touch electrode 10 and the touch leads 20 insulated from it (excluding the touch lead correspondingly connected to the touch electrode 10) by setting the fractures on the metal mesh lines. The touch electrode 10 and the touch leads 20 may need to be separated by setting the fractures. During the etching process, the metal mesh lines at the fractures may have inclined surfaces at a certain angle. The inclined surfaces of the fractures of the metal mesh lines and the flat part of the metal mesh lines may have different degrees of reflection of external light, and the degree of reflection of external light at the position where the metal mesh line is not set may be also different. Therefore, the degree of reflection of external light at the gaps between the touch electrode 10 and the touch leads 20 may be quite different from the touch electrode 10 without fractures, which affects the display uniformity.

As shown in FIG. 3, the touch electrode 10 may include the main electrode 110 and the plurality of branch electrodes 120 separated from each other. The plurality of branch electrodes 120 may be electrically connected to the main electrode 110. Accordingly, there may be gaps between the plurality of branch electrodes 120, and the plurality of branch electrodes 120 may be separated from each other by the fractures formed on the metal mesh lines. After the fractures are formed by etching, an inclined surface is formed at one fracture of the metal mesh lines. The fractures at the gaps between the touch electrode 10 and the touch lead 20 may form the inclined surfaces. To ensure that the structures of the metal mesh lines at the gaps between the touch electrode 10 and the touch leads 20 and inside the touch electrode 10 may be same, the structures at the positions where the metal mesh lines are not set may be also roughly the same, and the structures of the fracture inclined surfaces generated by etching the fractures on the metal mesh lines may be also roughly the same. The same here does not mean completely the same, but the same within a certain range. Thereby, the degree of reflection of external light inside the touch electrodes 10 may be basically the same, and the degree of reflection of external light at the gaps between the touch electrodes 10 and the touch leads 20 may be closer. By reducing the difference in light reflection inside the touch electrodes 10 and the gaps between the touch electrodes 10 and the touch leads 20, the visual display difference may be reduced, the recognizability of the etching lines in the touch panel by the human eye may be improved, and the uniformity of the display panel is improved.

In one embodiment as shown in FIG. 6, the touch electrodes 10 and the touch leads 20 may be disposed in a same metal layer.

Each touch electrode 10 on the touch panel may be formed by a single-layer metal mesh structure, and the touch electrodes 10 and the touch leads 20 may be disposed in the same metal layer, which may be used to form a self-capacitive touch panel. Self-capacitive touch electrodes may be used in the self-capacitive touch panel. When a finger touches the touch panel, each touch electrode 10 may have its own parasitic capacitance. After the finger touches the panel, it may be equivalent to the increase of the ground capacitance of the touch electrodes 10. The control chip IC may detect the change in the ground capacitance, and then may detect whether the finger is touched. The preparation process of the self-capacitive structure may be simpler. The touch electrodes 10 and the touch leads 20 may be formed by etching the same layer of metal mesh lines.

In some other embodiments, the touch electrodes may also be used in a mutual capacitance touch panel. For example, one touch electrode 10 may include a driving electrode TX and a sensing electrode RX. There may be a mutual capacitance coupled between the driving electrode RX and the sensing electrode RX. When the finger touches the panel, it may be equivalent to the change of the mutual capacitance, such that the detection signal at the end of the sensing electrode RX changes and then whether the finger is touched may be detected. The touch electrodes and touch leads of the mutual capacitance touch panel may be located on different metal layers, but the touch electrodes provided by the embodiments of the present disclosure may also be applied.

The above embodiments are used as examples to illustrate the present disclosure only, and do not limit the scope of the present disclosure. The touch electrodes provided by the present disclosure may be applied to various types of touch panels, and the present disclosure does not limit the structure of the touch panel.

Figure 7:
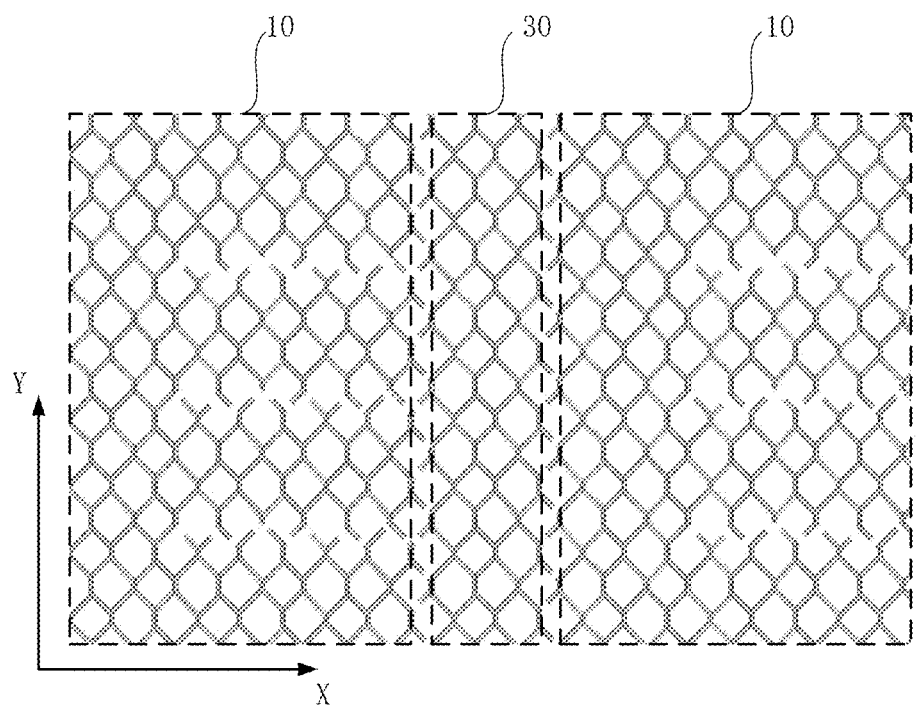
FIG. 7 illustrates a local structure of another exemplary type of touch electrodes consistent with various disclosed embodiments in the present disclosure.

In some embodiments shown in FIG. 7, the touch panel may further include virtual electrodes 30. The virtual electrodes 30 may be disposed between adjacent touch electrodes 10 and may include metal mesh lines.

There may be a gap between two adjacent touch electrodes 10 to prevent a short circuit between the two adjacent touch electrodes 10. The gap may be large, and no other structure may be disposed in the gap, and there may be also no metal mesh line at the gap. The touch electrode 10 may be formed by the metal mesh lines. Therefore, there may be a large difference in structure between the gaps and the touch electrodes 10. The area without the metal mesh lines and the area with the metal mesh lines in the touch electrode 10 may reflect the external light to different degrees. When the user uses the touch panel and light shines on the touch panel, the visual effect at the gaps between adjacent touch electrodes 10 and the touch electrodes 10 may be different, and the visual difference may be large, which may produce a visual trace phenomenon. To avoid this situation, the virtual electrodes 30 may be disposed between adjacent touch electrodes 10. The virtual electrodes 30 may include metal mesh lines. The virtual electrodes 30 may fill the gaps between adjacent touch electrodes 10 to improve the structural difference between the gaps and the touch electrodes 10. Further, the optical visibility of the touch panel may be improved.

The present disclosure has no limit on the positions, sizes, number, and shapes of the virtual electrodes, which may be configured according to the actual needs of the touch panel.

Figure 8:
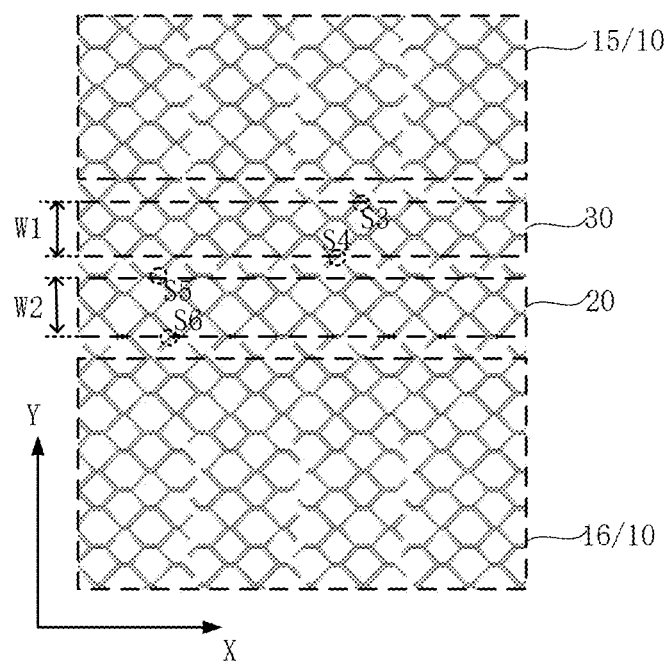
FIG. 8 illustrates a local structure of another exemplary type of touch electrodes consistent with various disclosed embodiments in the present disclosure.

In some embodiments shown in FIG. 8, in the touch panel, the virtual electrodes 30 may be disposed between adjacent touch electrodes, and also between the touch leads 20 and the touch electrodes 10. The virtual electrodes 30 may include metal mesh lines.

The touch panel may include the touch leads 20, and the virtual electrodes 30 may be arranged between the touch leads 20 and the touch electrodes 10. When one gap between one touch lead 20 and one corresponding touch electrode 10 is large, and no other structure is arranged at the gap, the absence of metal mesh lines at the gap may also lead to a large difference in structure between the gap and the touch electrode 10. The degree of reflection of external light may be different, resulting in a large visual difference. Therefore, the virtual electrodes 30 may also be arranged at the gap between the touch electrode 10 and the touch lead 20, and the virtual electrodes 30 may include metal mesh lines, thereby improving the optical visibility of the touch panel and enhancing the display effect.

The embodiments of the present disclosure do not limit the position, size, shape, etc. of the virtual electrodes, nor do they limit the specific positional relationship with the touch electrodes and the touch leads, which may be set according to the actual needs of the touch panel, and the above embodiments are only for illustration.

In some embodiments, as shown in FIG. 8, along a direction perpendicular to the extending direction of the virtual electrodes 30, the width of the virtual electrodes 30 may be W1. Along a direction perpendicular to the extending direction of the touch leads 20, the width of the touch leads 20 may be W2, where $0.8*W2<W1\le1.2*W2$.

Exemplarily, FIG. 8 shows two touch electrodes 10, including a touch electrode 15 and a touch electrode 16, each of which only shows a partial structure, and a touch lead 20 and a virtual electrode 30 are arranged between the adjacent touch electrodes 10. The X direction may be perpendicular to the Y direction. The X direction may be the extending direction of the virtual electrode 30, and may be also the extending direction of the touch lead 20; the Y direction is perpendicular to the extending direction of the virtual electrode 30. The Y direction may be also perpendicular to the extending direction of the touch lead 20. Along the Y direction, the width of the virtual electrode 30 is W1, the width of the touch lead 20 is W2, and $0.8*W2\le W1\le1.2*W2$.

The structures of the metal mesh may be the same. When the width of the virtual electrode 30 is similar to the width of the touch lead 20, the fractures on the metal mesh lines at the edge of the virtual electrode 30 may be similar to the fractures on the metal mesh lines at the edge of the touch lead 20 in the X direction, the gaps of the metal mesh fractures may be similar in the Y direction, and the fracture structures of the overall setting may be the same. Since the inclined surfaces formed by the etching fractures at the metal mesh line, the metal mesh lines without the fractures, and the area without the metal mesh lines may have different reflection degrees of the external light, an obvious visual difference may appear. By setting the width of the virtual electrodes 30 and the touch leads 20 to be similar, the structures of the metal mesh lines of the virtual electrodes 30 and the touch leads 20 may be the same, the position structures without the metal mesh lines may be roughly the same, and the structures of the fracture inclined surfaces generated by the etching fracture on the metal mesh lines may be also roughly the same. The term "same" here does not mean completely the same, but the same in a certain range. Therefore, the virtual electrodes 30 and the touch leads 20 may have basically the same degree of reflection of external light per unit area, reducing the difference in reflection, reducing the difference in light reflection at different positions in the touch panel, and improving visual recognizability. Taking into account the limitations of the process and the accuracy of human eye recognition, the relationship between the width W1 of the virtual electrodes 30 and the width W2 of the touch leads 20 may be $0.8*W2\le W1\le1.2*W2$, that is, there may be a certain difference between the values of W1 and W2, which may also improve the visual difference problem on the touch panel to a certain extent.

The touch electrodes 10 may be arranged in an array along the X direction (such as the extending direction of the scan lines) and the Y direction (such as the extending direction of the data lines). The virtual electrode 30 may include a third reference point S3 and a fourth reference point S4. The third reference point S3 may be the intersection formed by two metal mesh lines closest to the side fracture, and the fourth reference point S4 may be the intersection formed by two metal mesh lines closest to the side fracture. In the Y direction, the distance between the third reference point S3 and the fourth reference point S4 may be the width W1 of the virtual electrode 30. Similarly, the touch lead 20 may include a fifth reference point S5 and a sixth reference point S6. The fifth reference point S5 may be the intersection formed by two metal mesh lines closest to the side fracture, and the sixth reference point S6 may be the intersection formed by two metal mesh lines closest to the side fracture. In the Y direction, the distance between the fifth reference point S5 and the sixth reference point S6 may be the width W2 of the touch lead 20.

In the Y direction, the virtual electrode 30 may be provided with fractures on both sides, and the distance along the Y direction between the intersection formed by two metal mesh lines closest to the fractures on one side of the virtual electrode 30 and the intersection formed by two metal mesh lines closest to the fractures on the other side of the virtual electrode 30 may be the width W1 of the virtual electrode 30. In the Y direction, the touch lead 20 may be provided with fractures on both sides, and the distance along the Y direction between the intersection formed by two metal mesh lines closest to the fracture on one side of the touch lead 20 and the intersection formed by two metal mesh lines closest to the fractures on the other side of the touch lead 20 is the width W2 of the touch lead 20.

In some other embodiments, the third reference point, the fourth reference point, the fifth layer reference point and the sixth reference point may also be defined in other ways to determine the distance between adjacent branch electrodes, but they should be unified. The above embodiment is only one feasible way.

The term "same" in that the metal meshes have the same structure means that the layout and shape of the metal meshes are basically the same, but it does not mean that all metal meshes are exactly the same. "Same" may be understood as the same within a certain range. There may be slight differences due to process or other requirements, but the overall outline is similar, so the same structure is used here to express it.

The present disclosure has no limit on the extending directions of the touch leads and the virtual electrodes. The above embodiments are used as examples only to illustrate the present disclosure, and do not limit the scope of the present disclosure. The length of the virtual electrodes may be configured according to the actual needs, which is not limited in the present disclosure.

In some other embodiments, the width W1 of the virtual electrodes and the width W2 of the touch leads may also be in other proportional relationships, which may be selected according to actual needs, and the embodiments of the present disclosure do not limit this.

Figure 9:
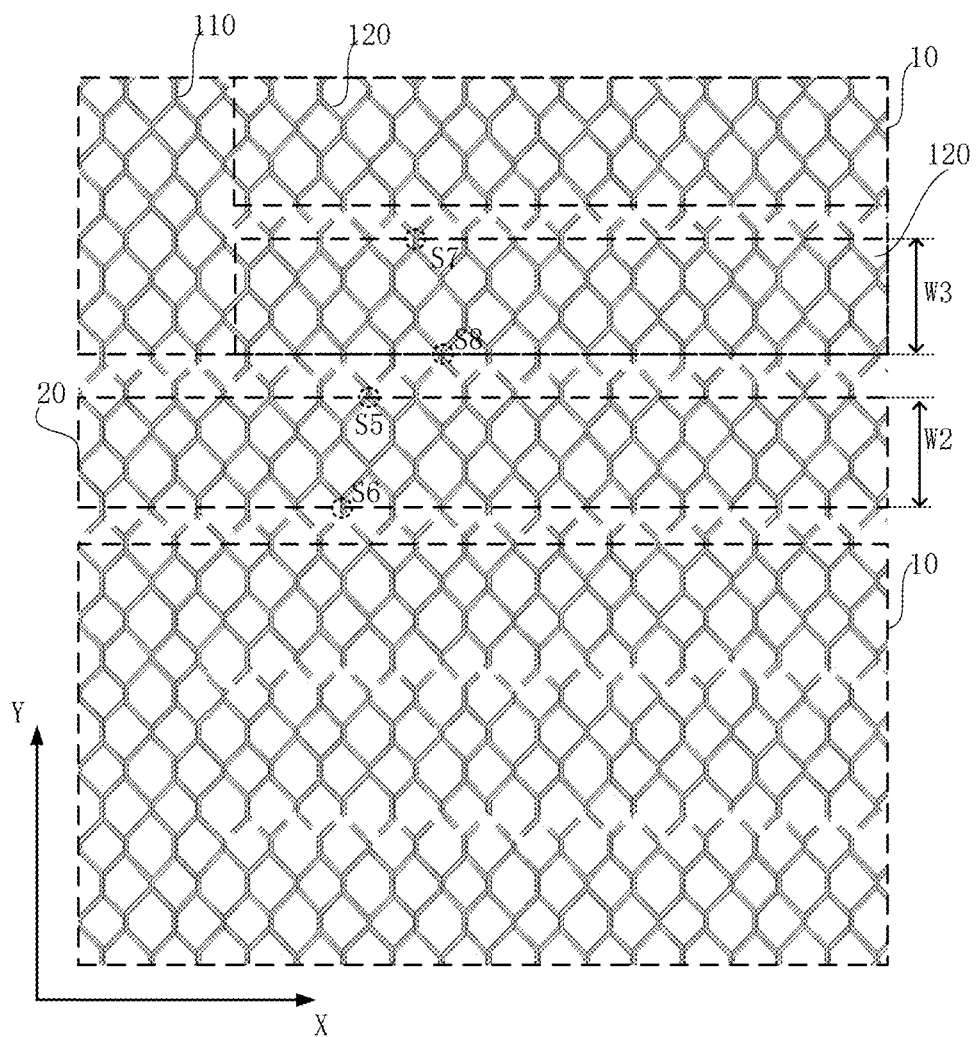
FIG. 9 illustrates a local structure of another exemplary type of touch electrodes consistent with various disclosed embodiments in the present disclosure.

In some other embodiments shown in FIG. 9, along a direction perpendicular to the extending direction of the branch electrodes 120, a width W3 of the branch electrodes 120 may be W3. Along the extending direction perpendicular to the touch leads 20, the width of the touch leads 20 may be W2, where $0.8*W2<W3<1.2*W2$.

Exemplarily, FIG. 9 shows two touch electrodes 10, and only a partial structure of each of the touch electrodes 10 is shown. One touch lead 20 may be disposed between the two adjacent touch electrodes 10. Each of the two touch electrodes 10 may include one main electrode 110 and the branch electrodes 120. The X direction is perpendicular to the Y direction, and the X direction is the extending direction of the branch electrodes 120. The Y direction is perpendicular to the extending direction of the branch electrodes 120, that is, the width of the branch electrodes 120 in the Y direction may be W3. And the X direction is also the extending direction of the touch leads 20, and the Y direction is perpendicular to the extending direction of the touch leads 20, that is, the width of the touch leads 20 in the Y direction is W2. Among them, along the Y direction, the width of the touch leads 20 is W2, the width of the branch electrodes 120 is W3, where $0.8*W2 \leq W3 \leq 1.2*W2$.

The metal mesh structure in the touch panel is the same. When the width of the touch leads 20 is similar to the width of the branch electrodes 120, the fractures of the metal mesh lines at the edges of the branch electrodes 120 may be similar to the fractures of the metal mesh lines at the edges of the touch leads 20 in the X direction, the gaps of the metal mesh fractures in the Y direction may be similar, and the overall fracture structures may be the same. Because the inclined surfaces formed by the etched fractures at the metal mesh line, the metal mesh lines without the fractures and the regions without the metal mesh lines may have different reflection degrees of external light, a more obvious visual difference may appear.

In the present disclosure, the structures of setting the fractures on the metal mesh lines may be the same, the structures of the metal mesh lines in the branch electrodes 120 and the touch leads 20 may be the same, the position structures where the metal mesh lines are not set may be roughly the same, and the structures of the fracture inclined surfaces generated by etching the fractures on the metal mesh lines may be also roughly the same. The term "same" here does not mean completely the same, but the same within a certain range. Thus, the reflection degrees of external light per unit area of the branch electrodes 120 and the touch leads 20 may be basically the same. Therefore, the difference of reflection may be reduced, and the difference of light reflection between the branch electrodes 120 and the touch leads 20 may be reduced. That is, the difference of light reflection at different positions in the touch panel may be reduced, and visual recognizability may be improved. Similarly, considering the limitation of the process and the recognition accuracy of the human eye, the relationship between the width W3 of the branch electrodes 120 and the width W2 of the touch leads 20 may be set as $0.8*W2 \leq W3 \leq 1.2*W2$, that is, there may be a certain difference between the values of W3 and W2, which may also improve the visual difference problem on the touch panel to a certain extent.

In one embodiment, the touch electrodes 10 may be arranged in an array along the X direction (such as the extending direction of the scan line) and the Y direction (such as the extending direction of the data line). The width W2 of the touch leads may refer to the setting method of the above embodiment, that is, in the Y direction, the distance between the fifth reference point S5 and the sixth reference point S6 is the width W2 of the touch leads 20. Similarly, the branch electrodes 120 includes a seventh reference point S7 and an eighth reference point S8. The seventh reference point S7 may be an intersection formed by two metal mesh lines closest to the fracture on the side, and the eighth reference point S8 may be an intersection formed by two metal mesh lines closest to the fracture on the side. In the Y direction, the distance between the seventh reference point S7 and the eighth reference point S8 is the width W3 of the branch electrodes 120.

In the Y direction, one branch electrode 120 may be provided with the fractures on both sides, and the distance between the intersection formed by two metal mesh lines closest to the fracture on one side of the branch electrode 120 and the intersection formed by two metal mesh lines closest to the fracture on the other side of the branch electrode 120 along the Y direction may be the width W3 of the branch electrode 120.

In some other embodiments, the third reference point, the fourth reference point, the seventh layer reference point and the eighth reference point may also be defined in other ways to determine the distance between adjacent branch electrodes, but they should be unified. The above embodiment is only one feasible way.

The term "same" in that the metal meshes have the same structure means that the layout and shape of the metal meshes are basically the same, but it does not mean that all metal meshes are exactly the same. "Same" may be understood as the same within a certain range. There may be slight differences due to process or other requirements, but the overall outline is similar, so the same structure is used here to express it.

The present disclosure has no limit on the extending directions of the touch leads and the branch electrodes. The above embodiments are used as examples only to illustrate the present disclosure, and do not limit the scope of the present disclosure. The length of the branch electrodes may be configured according to the actual needs, which is not limited in the present disclosure.

In some other embodiments, the width W3 of the branch electrodes and the width W2 of the touch leads may also be in other proportional relationships, which may be selected according to actual needs, and the embodiments of the present disclosure do not limit this.

Figure 10:
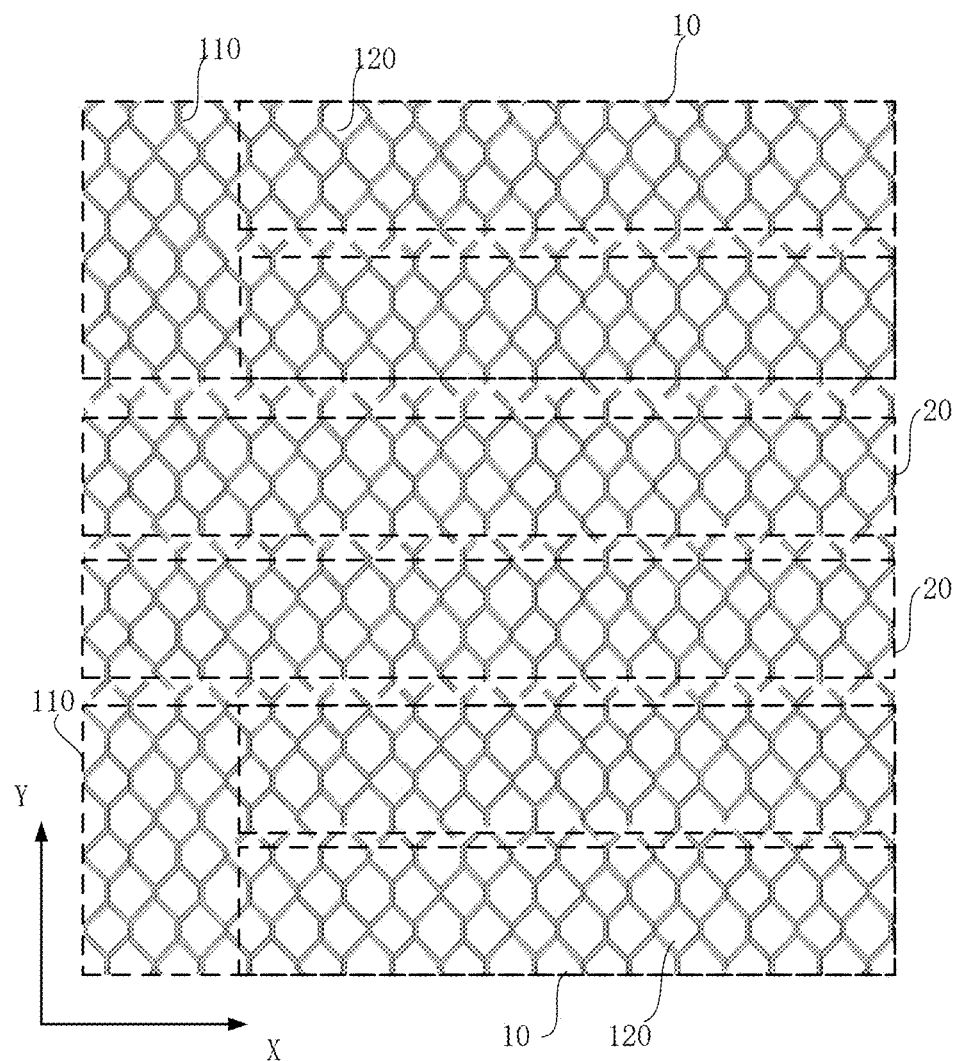
FIG. 10 illustrates an exemplary metal mesh structure correspondingly with a unit pixel area consistent with various disclosed embodiments in the present disclosure.

In some embodiments shown in FIG. 10 illustrating a schematic diagram of the metal mesh structure corresponding to one unit pixel area and FIG. 9, the adjacent branch electrodes 120 in the touch electrodes 10, the touch electrodes 10 and the touch leads 20, and adjacent touch leads 20 may be all separated by metal mesh line breaks.

The density of the fractures of the metal mesh lines within a unit pixel area in the touch electrodes 10 may be the same as the density of the fractures of the metal mesh lines within a unit pixel area at the gaps between adjacent touch electrodes 10.

Figure 11:
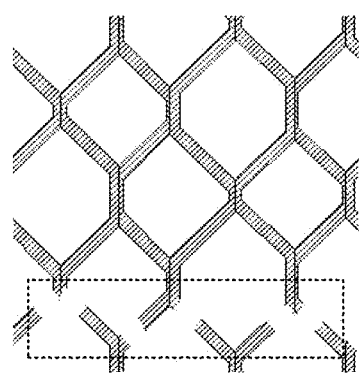
FIG. 11 illustrates a schematic diagram of a fracture structure within a unit pixel area; consistent with various disclosed embodiments in the present disclosure.

Exemplarily, FIG. 10 shows a partial structure of two adjacent touch electrodes 10. One touch electrode 10 may include branch electrodes 120 and one main electrode 110, and the branch electrodes 120 may be electrically connected to the main electrode 110. Two touch leads 20 may be disposed between the two adjacent touch electrodes 10, and the two touch leads 20 may be separated from each other. The adjacent branch electrodes may be separated by metal mesh line breaks, the touch electrode 10 and the touch lead 20 are also separated by metal mesh line fractures, and the adjacent touch leads 20 may be also separated by metal mesh line fractures. FIG. 11 is a schematic diagram of a fracture structure within a unit pixel area provided by one embodiment of the present disclosure, and the shape of the fractures may refer to the structure of FIG. 11. In some other embodiments, the fractures may also include structures of other different shapes. The present embodiment is used as an example only for illustration, indicating that the connection of the metal mesh lines is disconnected at a fracture position.

According to the structure of the touch panel, the holes of the metal mesh lines in the touch panel may expose the pixels below, and the light emitted by the pixels may pass through the holes of the metal mesh lines when emitting outward. Exemplarily, FIG. 11 shows the density of the metal mesh line fractures within the unit pixel area at the gap between adjacent touch electrodes 10. That is, within the unit pixel area, there may be corresponding metal mesh lines as shown in FIG. 11, and there may be 6 fractures on the metal mesh lines. Based on this, one main electrode 110 and the plurality of branch electrodes 120 may be provided in one touch electrode 10, and each branch electrode 120 may be separated from each other. Each branch electrode 120 may be also separated by the metal mesh line fractures. Within the unit pixel area, the structures of the metal mesh lines may be the same, the density of the positions where the metal mesh lines are not set may be basically the same, and the density of the fracture inclined surfaces generated by the etching fractures on the metal mesh lines may be also basically the same. The term "same" here does not mean completely the same, but the same within a certain range. Therefore, the degree of reflection of external light within the unit pixel area of the touch electrodes 10 and the gaps between adjacent touch electrodes 10 may be closer. By reducing the difference in light reflection inside the touch electrodes 10 and the gaps between adjacent touch electrodes 10, the visual display difference caused by the gaps between inside the touch electrodes 10 and the gaps between adjacent touch electrodes 10 is reduced, the recognizability of the etched lines in the touch panel by the human eye may be improved, and the uniformity of the display panel may be improved.

In the touch panel, the structures of the metal mesh lines corresponding to the unit pixel area in the touch electrodes 10 may be the same as the structures of the metal mesh lines corresponding to the unit pixel area at the gaps between adjacent touch electrodes 10, and the density of the inclined surfaces of the fractures formed by the etching fractures may be also the same. It should be understood that the term "same" here does not mean completely consistent, but the overall structure is relatively similar, which means the same within a certain range. Therefore, the metal mesh lines of the unit pixel area in the touch electrodes 10 may be similar to the structure in FIG. 11. Within the unit pixel area of the touch electrode 10, 6 fractures may be also arranged on the metal mesh lines, such that the density of the metal mesh line fractures within the unit pixel area of the touch electrode 10 is the same as the density of the metal mesh line fractures within the unit pixel area at the gaps between adjacent touch electrodes 10, better reducing the visual display difference caused by the inside of the touch electrodes 10 and the gaps between the adjacent touch electrodes 10, reducing the recognizability of the gaps between the adjacent touch electrodes 10 by the human eye, and improving the display effect of the panel.

It should be noted that the embodiment of the present disclosure does not limit the specific size of the unit pixel area, and the unit pixel area may include one pixel sub-unit, two pixel sub-units, etc., and is set according to the actual effect.

In some embodiments, the touch panel may include the virtual electrodes. The density of the metal mesh line fractures within the unit pixel area in the virtual electrodes may be also same as the density of the metal mesh line fractures within the unit pixel area at the gaps between adjacent touch electrodes.

Figure 12:
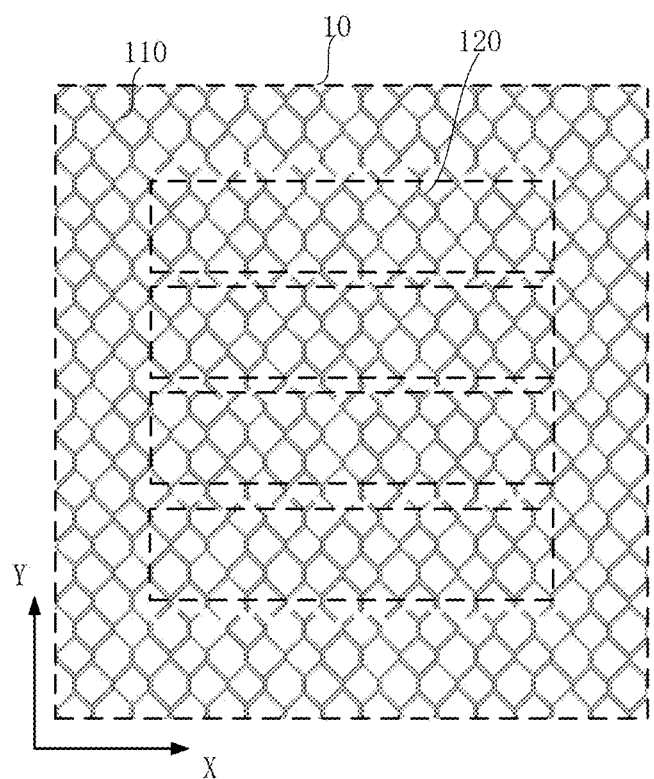
FIG. 12 illustrates another exemplary type of touch electrodes consistent with various disclosed embodiments in the present disclosure.

In some embodiments shown in FIG. 12 which is a schematic diagram of anther touch electrode 10, the plurality of branch electrodes 120 of the touch electrode 10 may be located in the area surrounded by the main electrode 110.

Exemplarily, the touch electrode 10 may include the plurality of branch electrodes 120, and four branch electrodes 120 are given as an example in the present embodiment. The four branch electrodes 120 may be all arranged in the main electrode 110. The plurality of branch electrodes 120 may be located in the area surrounded by the main electrode 110. The main electrode 110 may have a closed structure, and each branch electrode 120 may be electrically connected to the main electrode 110. It is necessary to ensure that each branch electrode 120 in the touch electrode 10 is connected to the main electrode 110 to avoid the occurrence of disconnected floating electrodes. The metal mesh lines in the touch electrode 10 may need to sense the touch information of the finger, and it may be necessary to ensure that the main electrode 110 in the entire touch electrode 10 and the branch electrodes 120 at each position are connected as a whole.

Figure 13:
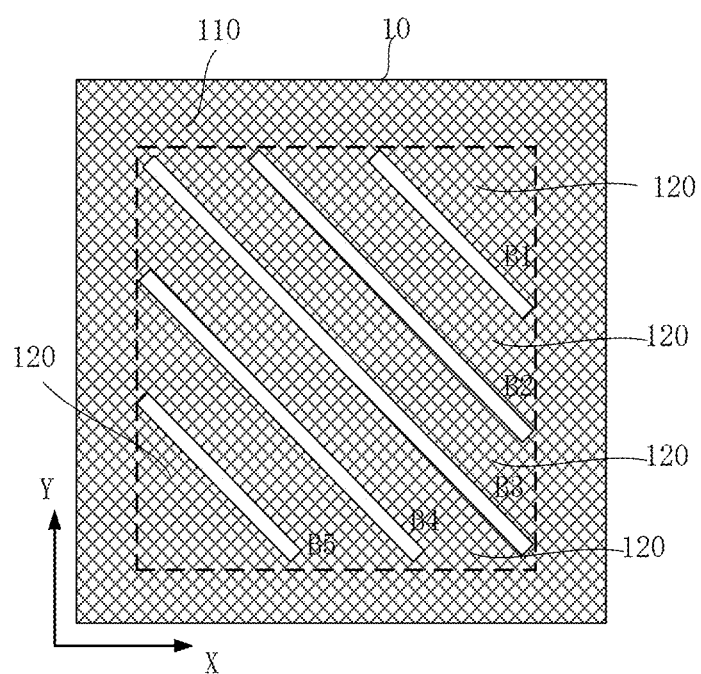
FIG. 13 illustrates another exemplary type of touch electrodes consistent with various disclosed embodiments in the present disclosure.

In some yet other embodiments shown in FIG. 13 which is a schematic diagram of anther touch electrode 10, the plurality of branch electrodes 120 may be located in different areas of the touch electrode 10. When the main electrode 110 is only provided on one side of the touch electrode 10, the branch electrodes 120 far away from the main electrode 110 may be difficult to electrically connected to the main electrode 110. When the surrounding main electrode 110 is provided, and each branch electrode 120 is located in the area surrounded by the main electrode 110, the distribution area of the main electrode 110 in the touch electrode 10 may be expanded, being more conducive to the electrical connection of branch electrodes 120 at different positions with different shapes with the main electrode 110, and ensuring that the entire touch electrode 10 is in a connected state. The touch electrode 10 may include the plurality of branch electrodes 120, and six branch electrodes 120 are shown as examples in the figure, where B1, B2, B3, B4, and B5 are gaps between the branch electrodes 120, and the gaps include a plurality of fractures for separating adjacent branch electrodes 120, thereby obtaining six mutually separated branch electrodes 120. Specific structures of the fractures may refer to other drawings of the present disclosure.

Figure 14:
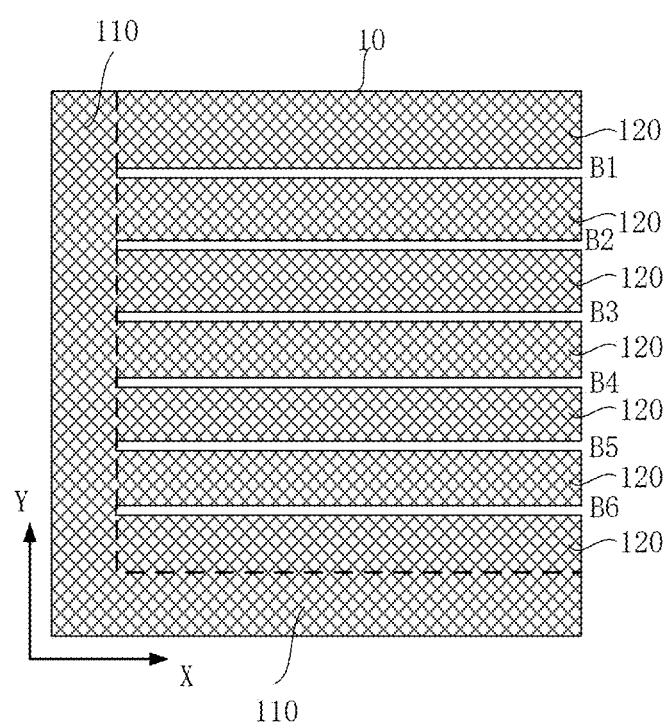
FIG. 14 illustrates another exemplary type of touch electrodes consistent with various disclosed embodiments in the present disclosure.

In some yet other embodiments shown in FIG. 14 which is a schematic diagram of anther touch electrode 10, the main electrode 110 may include a first main electrode and a second main electrode. The first main electrode may be electrically connected to the second main electrode; and the plurality of branch electrodes 120 may be electrically connected to the main electrode 110. For example, the first main electrode and the second main electrode may extend in different directions. The first main electrode may extend in the X direction, and the second main electrode may extend in the Y direction. Since the first main electrode is electrically connected to the second main electrode, the plurality of branch electrodes 120 may be electrically connected to the first main electrode or the second main electrode, or to both, according to their own positions. This may be conducive to the electrical connection of branch electrodes 120 at different positions and in different shapes with the main electrode 110, ensuring that the entire touch electrode 10 is in a connected state.

Figure 15:
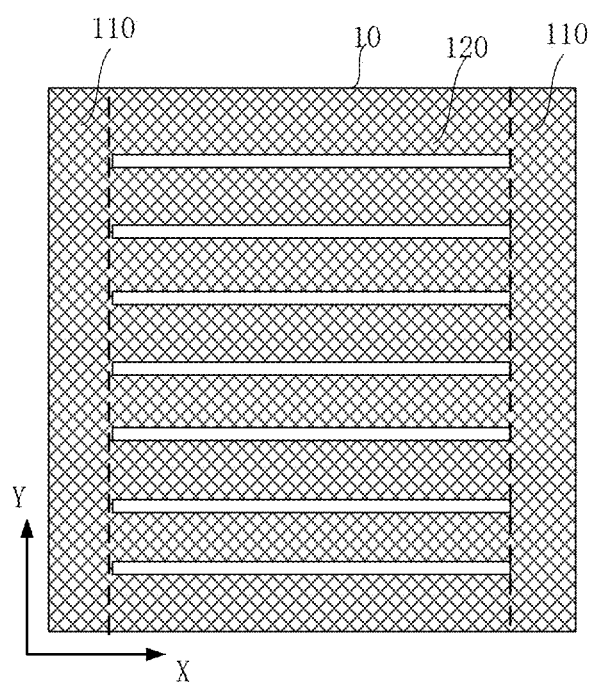
FIG. 15 illustrates another exemplary type of touch electrodes consistent with various disclosed embodiments in the present disclosure.

In some yet other embodiments shown in FIG. 15 which is a schematic diagram of anther touch electrode 10, the main electrode 110 may include a first main electrode and a second main electrode. The plurality of branch electrodes 120 may be electrically connected to both the first main electrode and the second main electrode. For example, the first main electrode and the second main electrode may extend in a same direction. The first main electrode may extend in the Y direction, and the second main electrode may extend in the Y direction. The plurality of branch electrodes 120 may be electrically connected to both the first main electrode and the second main electrode, such that the first main electrode, the second main electrode, and the plurality of branch electrodes 120 are electrically connected to each other, ensuring that the entire touch electrode 10 is in a connected state to prevent the touch electrode from being unable to sense the touch signal.

The present disclosure has no limit on the positions, orientations, or shapes of the first main electrode and the second electrode, which may be configured according to actual needs. Also, the number of the main electrode may be increased according to the actual needs. The above embodiments are used as examples only to illustrate the present disclosure.

Figure 16:
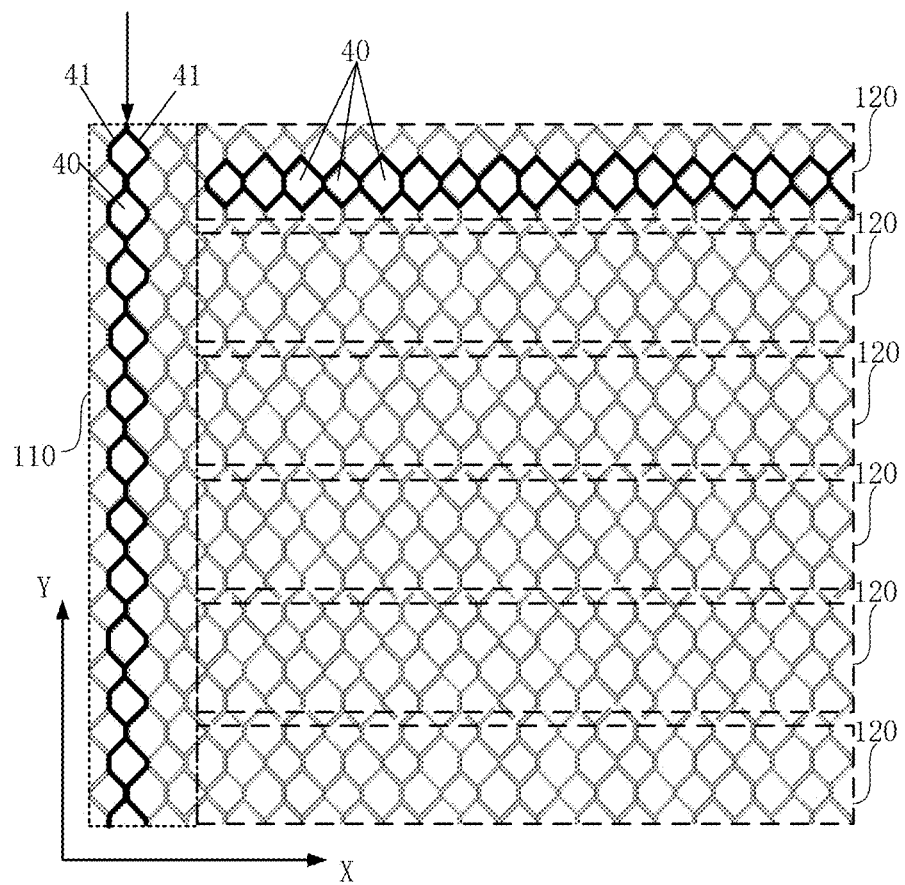
FIG. 16 illustrates another exemplary type of touch electrodes consistent with various disclosed embodiments in the present disclosure.

In some yet other embodiments shown in FIG. 16 which is a schematic diagram of anther touch electrode 10, the main electrode 110 may include at least one mesh structure 40 formed by metal mesh lines 41 in the direction perpendicular to the extending direction of the main electrode 110, and may include a plurality of mesh structures 40 formed by metal mesh lines 41 in the extending direction of the main electrode 110; and/or, one branch electrode 120 may include at least one mesh structure 40 formed by metal mesh lines 41 in the direction perpendicular to the extending direction of the branch electrode 120, and may include a plurality of mesh structures 40 formed by metal mesh lines 41 in the extending direction of the branch electrode 120.

The bold part in FIG. 16 indicates an exemplary mesh structure 40, and the mesh structure 40 may be formed by two metal mesh lines 41. The metal mesh lines 41 may be used to transmit data signals. For example, the data signal may flow through the touch electrode 10 from the position where the arrow is located, and the data signal may be transmitted through the branches formed by the two metal mesh lines 41 respectively.

For example, the X direction may be perpendicular to the Y direction. The Y direction may be the extending direction of the main electrode 110, and the X direction may be perpendicular to the extending direction of the main electrode 110. In the X direction, the main electrode 110 may include at least one mesh structure 40. Since the mesh structure 40 is formed by two metal mesh lines 41, there may be at least two signal transmission paths for one mesh structure 40. When one metal mesh line 41 is disconnected and data transmission cannot be performed, the other metal mesh line 41 may still work normally and perform data transmission to avoid affecting the normal operation of the touch electrode 10. In the Y direction, the main electrode 110 may include the plurality of mesh structures 40. The bold part in the figure exemplifies 11 complete mesh structures 40, which is used as an example only to illustrate the present disclosure and does not limit the scope of the present disclosure. The setup may be specifically configured according to the structure of the touch electrode 10.

For example, the touch electrode 10 may further include the plurality of branch electrodes 120. The X direction may be perpendicular to the Y direction. The X direction may be the extending direction of one branch electrode 120, and the Y direction may be perpendicular to the extending direction of the branch electrode 120. In the X direction, the branch electrode 120 may include at least one mesh structure 40. Since the mesh structure 40 is formed by two metal mesh lines 41, there may be at least two signal transmission paths for one mesh structure 40. When one metal mesh line 41 is disconnected and data transmission cannot be performed, the other metal mesh line 41 may still work normally and perform data transmission to avoid affecting the normal operation of the touch electrode 10. In the X direction, the branch electrode 120 may include the plurality of mesh structures 40. The bold part in the figure exemplifies 16 complete mesh structures 40, which is used as an example only to illustrate the present disclosure and does not limit the scope of the present disclosure. The setup may be specifically configured according to the structure of the touch electrode 10.

In some embodiments, the main electrode 110 may include at least one mesh structure 40 formed by metal mesh lines 41 in the direction perpendicular to the extending direction of the main electrode 110, and may include a plurality of mesh structures 40 formed by metal mesh lines 41 in the extending direction of the main electrode 110. Further, one branch electrode 120 may include at least one mesh structure 40 formed by metal mesh lines 41 in the direction perpendicular to the extending direction of the branch electrode 120, and may include a plurality of mesh structures 40 formed by metal mesh lines 41 in the extending direction of the branch electrode 120. This may ensure that when any metal mesh line 41 in the main electrode 110 or the plurality of branch electrodes 120 in the touch electrode 10 is disconnected, the normal operation of the touch electrode 10 is not affected. For the specific principle, please refer to the above content.

In some embodiments shown in FIG. 13 and FIG. 14, the extending direction of each of the plurality of branch electrodes 120 may be same.

Exemplarily, the touch electrode 10 may include the plurality of branch electrodes 120, and the extending direction of each branch electrode 120 may be the same. The X direction may be perpendicular to the Y direction. As shown in FIG. 13, the touch electrode 10 may include 6 branch electrodes 120, and the gaps B1, B2, B3, B4, and B5 between adjacent branch electrodes 120 may be provided with fracture. The extending direction of each branch electrode 120 formed may be the extending direction of a corresponding one of B1-B5, respectively. B1, B2, B3, B4, and B5 may be parallel to each other. Therefore, the extending directions of each branch electrode 120 in the touch electrode 10 may be the same. The fracture extending directions of the above-mentioned structure may be all consistent. In the process of manufacturing the touch electrode 10, the preparation process may be simplified, the manufacturing efficiency may be improved. The extending directions of the fractures may not need to be adjusted, which may greatly improve the manufacturing efficiency of the touch panel. In the present embodiment of the present disclosure, the gaps B1-B5 of each branch electrode 120 may be at angles with the X direction and the Y direction. In other embodiments, the fractures may also be arranged along other directions. As shown in FIG. 14, in another embodiment, the touch electrode 10 may include 7 branch electrodes 120, and the gaps B1-B6 between adjacent branch electrodes 120 may be provided with fractures. The extending direction of each branch electrode 120 formed may be the extending direction of a corresponding one of B1-B6 respectively. B1, B2, B3, B4, B5, and B6 may be parallel to each other. Therefore, the extending directions of each branch electrode 120 in the touch electrode 10 may be the same. In the present embodiment of the present disclosure, the gaps B1-B6 of each branch electrode 120 may be parallel to the X direction and perpendicular to the Y direction, such that the extending direction of each branch electrode 120 may be the same as the X direction. Similarly, the fractures at the edges of each branch electrode 120 in the touch electrode 10 may have the same extending direction. In the process of manufacturing the touch electrode 10, the preparation process may be simplified and the overall production efficiency may be improved.

Figure 17:
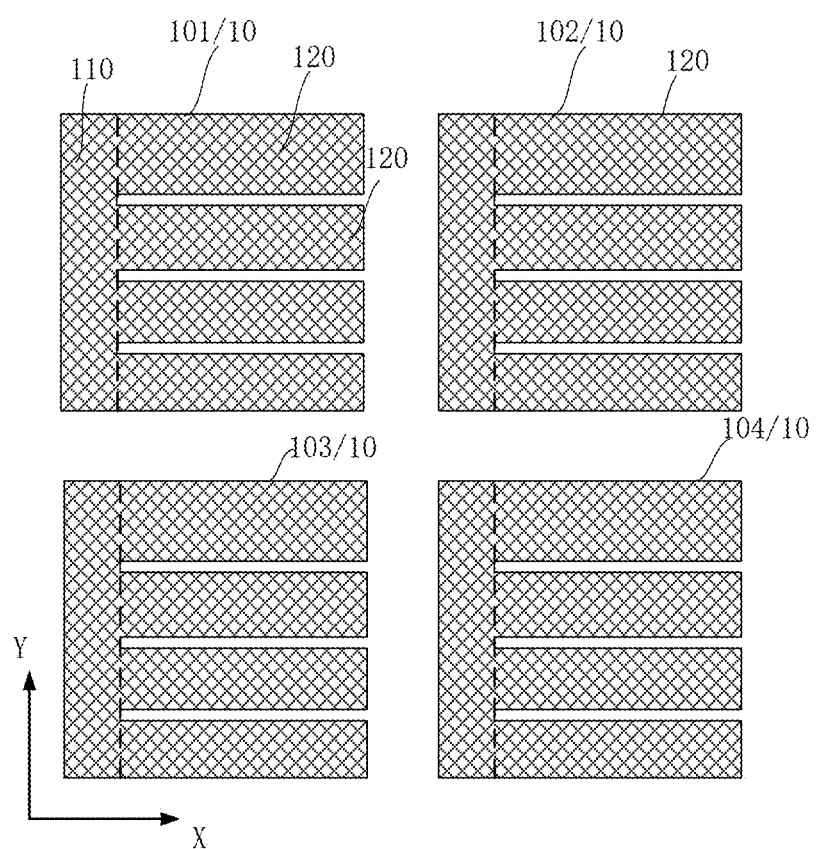
FIG. 17 illustrates a local structure of another exemplary touch panel consistent with various disclosed embodiments in the present disclosure.

In some embodiments shown in FIG. 17 which is a schematic diagram of the partial structure of another touch panel, the extending directions of the gaps between adjacent touch electrodes 10 may include a first direction and a second direction. The extending direction of one branch electrode 120 may be the first direction. The first direction may intersect with the second direction.

Exemplarily, in the embodiment shown in FIG. 17, four touch electrodes 10 may be provided and may be arranged in an array of two by two. There may be gaps between adjacent touch electrodes 10, and the extending directions of the gaps may include the first direction and the second direction. For example, the first direction may be set to the X direction, the second direction may be set to the Y direction, and the first direction may intersect with the second direction. The X direction and the Y direction in the figure are perpendicular to each other. The touch electrode 101 and the touch electrode 102 may be adjacent touch electrodes, and the gap between the touch electrode 101 and the touch electrode 102 may extend along the second direction. The touch electrode 101 and the touch electrode 103 may also be adjacent touch electrodes, and the gap between the touch electrode 101 and the touch electrode 103 may extend along the first direction. Similarly, the touch electrode 103 and the touch electrode 104 may be also adjacent touch electrodes, and the gap between the touch electrode 103 and the touch electrode 104 may extend along the second direction. The touch electrode 102 and the touch electrode 104 may also be adjacent touch electrodes, and the gap between the touch electrode 102 and the touch electrode 104 may extend along the first direction. The extending directions of the branch electrodes 120 in the touch electrode 10 may be the first direction, that is, each branch electrode may extend along the X direction.

There may be gaps between adjacent touch electrodes 10, which are separated from each other. The separation may be achieved by setting the fractures at the edges of the touch electrodes 10, and the extending directions of the gaps may represent the extending directions of the fractures. The plurality of branch electrodes 120 may be also separated from each other by setting the fractures, and the extending directions of the plurality of branch electrodes 120 may represent the extending directions of the fractures, such that the extending direction of one branch electrode 120 is the same as the extending direction of the gap between adjacent and corresponding touch electrodes 10. When the extending direction of the fractures on the branch electrode 120 is consistent with the extending direction of the edge of the touch electrode 10, there may be no need to frequently adjust the positions of the extending directions of the fractures when manufacturing a touch panel, which may greatly simplify the preparation process of the touch panel.

Figure 18:
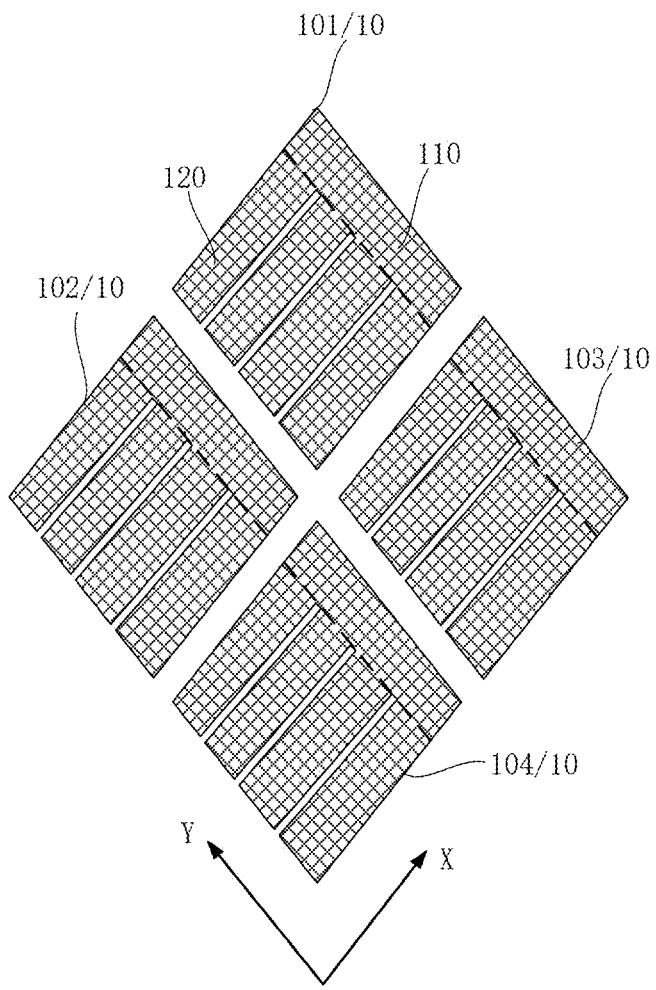
FIG. 18 illustrates a local structure of another exemplary touch panel consistent with various disclosed embodiments in the present disclosure.

In some other embodiments shown in FIG. 18 which is a schematic diagram of the partial structure of another touch panel different from the embodiment shown in FIG. 17, four touch electrodes 10 may be provided and may be arranged in an array of two by two. There may be gaps between adjacent touch electrodes 10, and the extending directions of the gaps may include the first direction and the second direction. The first direction may be set to the X direction, the second direction may be set to the Y direction, and the first direction may intersect with the second direction. The touch electrode 101 and the touch electrode 102 may be adjacent touch electrodes, and the gap between the touch electrode 101 and the touch electrode 102 may extend along the first direction. The touch electrode 101 and the touch electrode 103 may also be adjacent touch electrodes, and the gap between the touch electrode 101 and the touch electrode 103 may extend along the second direction. Similarly, the touch electrode 103 and the touch electrode 104 may be also adjacent touch electrodes, and the gap between the touch electrode 103 and the touch electrode 104 may extend along the second direction. The touch electrode 102 and the touch electrode 104 may also be adjacent touch electrodes, and the gap between the touch electrode 102 and the touch electrode 104 may extend along the first direction. The extending directions of the branch electrodes 120 in the touch electrode 10 may be the first direction, that is, each branch electrode may extend along the X direction. The process for forming the fractures may be simplified.

In some other embodiments, the extending directions of the plurality of branch electrodes in the touch electrode may be also the second direction. There may be no need to frequently adjust the extending directions of the fractures, simplifying the process.

The above embodiments are used as examples only to illustrate the present disclosure, and do not limit the scope of the present disclosure. In various embodiments, the first direction and the second direction may be configured according to actual needs.

Figure 19:
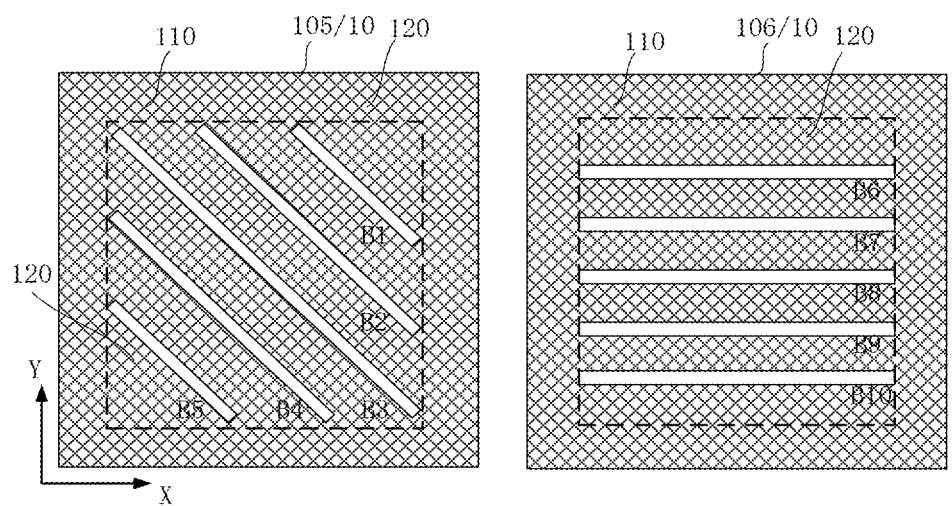
FIG. 19 illustrates a local structure of another exemplary touch panel consistent with various disclosed embodiments in the present disclosure.

In some other embodiments shown in FIG. 19 which is a schematic diagram of the partial structure of another touch panel different, the plurality of branch electrodes 120 of adjacent touch electrode 10 may have different extending directions.

For example, in FIG. 19, two adjacent touch electrodes, that is, the touch electrode 105 and the touch electrode 106, may be provided, and arranged in an array in the X direction and the Y direction. The X direction may be perpendicular to the Y direction. The extending directions of the fractures of each branch electrode 120 in the touch electrode 105 may be along the extending direction of the gap B1-B5 respectively. B1, B2, B3, B4 and B5 may be parallel to each other, and may have included angles with the X direction and the Y direction (B1-B5 are not perpendicular to the X direction/Y direction). The extending directions of the fractures of each branch electrode 120 in the touch electrode 106 may be along the extending direction of B6-B10. B6, B7, B8, B9 and B10 may be parallel to each other, parallel to the X direction, and perpendicular to the Y direction. Therefore, the extending direction of the branch electrodes 120 in the touch electrode 105 may be different from the extending direction of the branch electrodes 120 in the touch electrode 106.

The touch panel may include the plurality of touch electrodes 10 arranged in an array. When the branch electrodes 120 in each touch electrode 10 extend in the same direction, for example, all extend in the X direction, the branch electrodes 120 may be relatively regular, and the fractures of each branch electrode 120 may be also arranged in the same direction. When etching the fractures, the angle and direction of the fracture inclination surfaces of the metal mesh lines may be consistent. Therefore, the reflection directions of the light at the inclination surfaces of each fracture on the touch panel may be consistent, and the light output amount may be the same. Therefore, the light reflection may also have regularity. When the user looks directly at the touch panel at a certain angle, it may be easier to identify the regular arrangement, thereby observing the positions where the branch electrodes 120 in the touch panel are separated from each other. The display of the panel may be affected.

In the present disclosure, the extending directions of the branch electrodes 120 of adjacent touch electrodes 10 may be different. That is, the directions of the fractures separating the branch electrodes 120 in the adjacent touch electrodes 10 may be different. Therefore, when etching the fractures, there may be differences in the angles and directions of the fracture inclined surfaces formed on the metal mesh lines. When the angles and directions of the fracture inclined surfaces are different, there may be certain differences in the light output amount at some angles, avoiding the possibility of the user observing the fractures because of the regular arrangement. Although when observing the touch panel at a certain angle, the angles and directions of the fracture inclined surfaces of the metal mesh lines are different and the light output amount is different, the fractures may not only reflect light at one angle, such that the total light output amount at each angle may be consistent. Even when the extending directions of the branch electrodes 120 in the adjacent touch electrodes 10 are different, the total light output when each touch electrode 10 reflects light may not be affected and there may be no brightness difference between adjacent touch electrodes 10.

In some other embodiments, the extending directions of the branch electrodes in all adjacent touch electrodes may be different, or the extending directions of the branch electrodes in some adjacent touch electrodes may be different, or the extending directions of some branch electrodes in adjacent touch electrodes may be the same, or the extending directions of some branch electrodes in some adjacent touch electrodes may be different.

It should be noted that the embodiments of the present disclosure do not limit the number, shapes, and positions of the branch electrodes in the touch electrodes, which may be selected according to actual needs, and the above embodiments are only used as examples.

Figure 20:
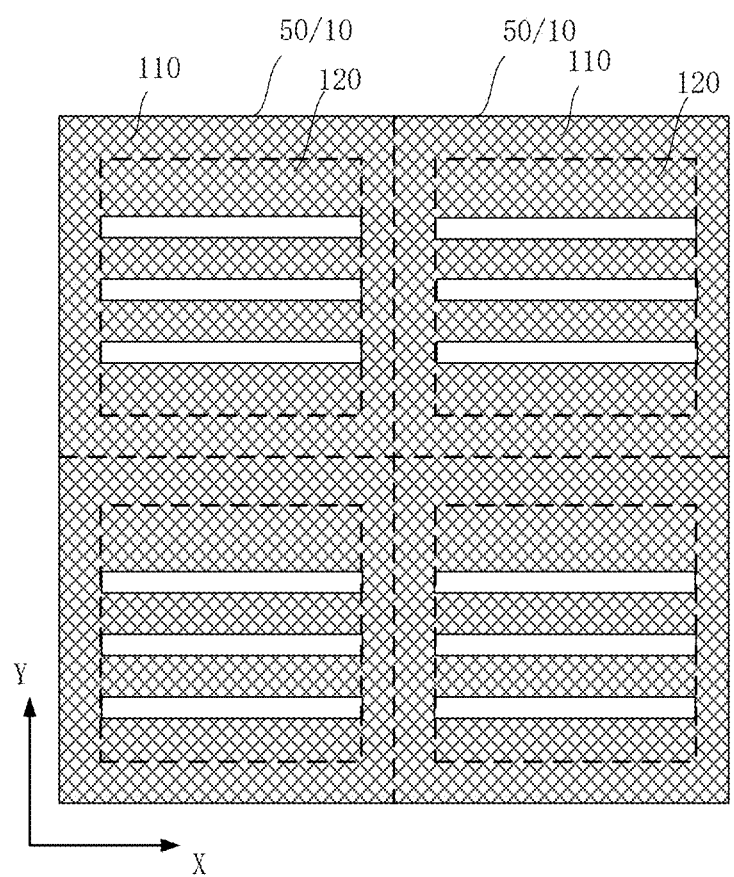
FIG. 20 illustrates another exemplary type of touch electrodes consistent with various disclosed embodiments in the present disclosure.

In some embodiments shown in FIG. 20 which is a structural schematic of another touch electrode, one touch electrode 10 may include a plurality of touch sub-units 50, and each touch sub-unit 50 may include a main electrode 110 and a plurality of branch electrodes 120 separated from each other. The plurality of branch electrodes 120 in one same touch sub-unit 50 may be all electrically connected to the main electrode 110 in the touch sub-unit 50. Adjacent touch sub-units 50 in one same touch electrode 10 may be electrically connected through the main electrodes 110.

One touch electrode 10 may include the plurality of touch sub-units 50. For example, in one embodiment shown in FIG. 20, one touch electrode 10 may include four touch sub-units 50, and each touch sub-unit 50 may include one main electrode 110 and a plurality of branch electrodes 120 separated from each other. The light may be reflected through the fractures between the branch electrodes 120, such that the reflection degree of the entire touch electrode 10 to the light is closer to the reflection degree of the gaps between the adjacent touch electrodes 10 to the light, thereby reducing the visual brightness difference. Each branch electrode 120 in one same touch sub-unit 50 may be electrically connected to the main electrode in touch sub-unit 50, and adjacent touch sub-units 50 in the same touch electrode 10 may be electrically connected through the main electrodes 110, to ensure that each position in the touch electrode 10 is connected to each other and avoid the floating electrode. The data transmission of the touch electrode 10 may be ensured.

The touch electrode 10 is divided into a plurality of touch sub-units 50, each of which includes a main electrode 110, to expand the spatial range of the main electrode 110, and ensure that the branch electrodes 120 in each area of the touch electrode 10 can be electrically connected to the main electrode 110, and also ensure the connection between the touch electrodes.

By dividing one touch electrode 10 into a plurality of touch sub-units 50 and making each touch sub-unit 50 including one main electrode 110, the spatial range for setting the main electrodes 110 may be expanded, ensuring that the branch electrodes 120 in each area of the touch electrode 10 are electrically connected to the main electrode 110, and also ensuring connectivity between the touch electrodes.

The above embodiment is used as an example only to illustrate the present disclosure and does not limit the scope of the present disclosure. The number, shapes, positions, or sizes of the touch sub-units are not limited in the present disclosure, and may be configured according to actual needs.

Figure 21:
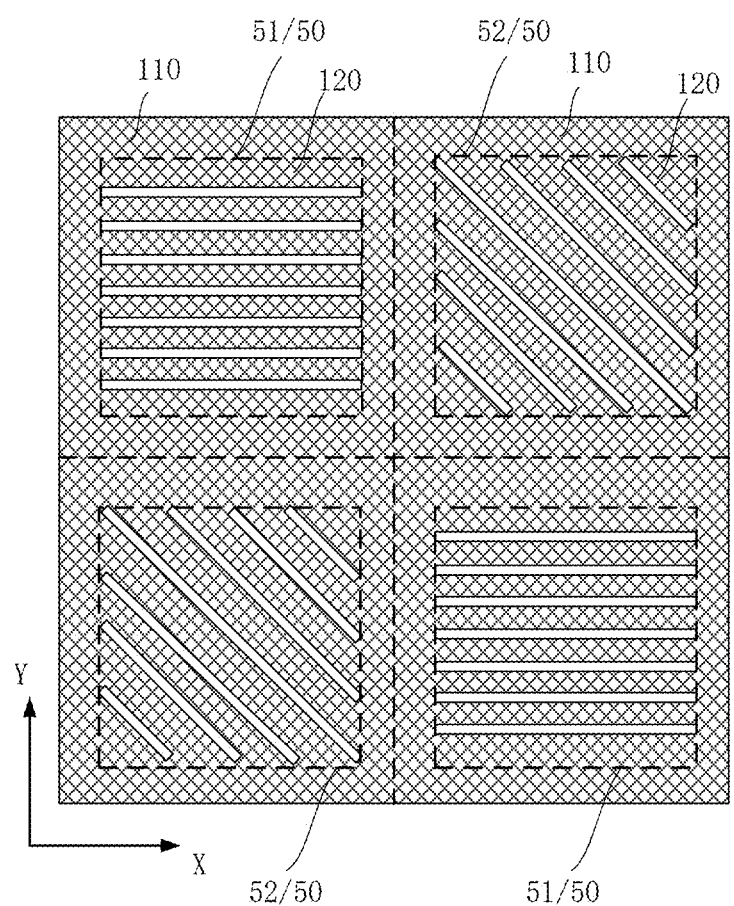
FIG. 21 illustrates another exemplary type of touch electrodes consistent with various disclosed embodiments in the present disclosure.

In some embodiments shown in FIG. 21 which is a structural schematic of another touch electrode, the touch sub-unit 50 may include first touch sub-units 51 and second touch sub-units 52. The branch electrodes 120 of the first touch sub-units 51 and the branch electrodes 120 in the second touch sub-units 52 may extend in different directions.

Exemplarily, FIG. 21 shows one touch electrode. The touch electrode may include four touch sub-units 50, namely, two first touch sub-units 51 and two second touch sub-units 52. The X direction may be perpendicular to the Y direction. One first touch sub-unit 51 may include a plurality of branch electrodes 120, and the extending direction of each branch electrode 120 in the first touch sub-unit 51 may be the X direction. One second touch sub-unit 52 may also include a plurality of branch electrodes 120, and the extending direction of each branch electrode 120 in the second touch sub-unit 52 may intersect with the X direction. Therefore, the branch electrodes 120 of the first touch sub-unit 51 and the branch electrodes 120 of the second touch sub-unit 52 may extend in different directions.

With this structure, it may be possible to avoid that the branch electrodes 120 at various locations in the touch electrode extend in the same direction, and to avoid that the arrangement of each branch electrode 120 is relatively regular. When the branch electrodes 120 at different positions of the touch electrode are distributed regularly, for example, are arranged along the same direction, the angles and directions of the fracture inclination surfaces of the metal mesh lines when etching fractures may be consistent. Therefore, the reflection directions of the light at the inclination surfaces of each fracture on the touch panel may be consistent, and the light output amount may be the same. Therefore, the light reflection may also have regularity. When the user looks directly at the touch panel at a certain angle, it may be easier to identify the regular arrangement, thereby observing the positions where the branch electrodes 120 in the touch panel are separated from each other. The display of the panel may be affected.

In the present disclosure, the extending directions of the branch electrodes 120 of adjacent touch electrodes 10 may be different. The fractures in the branch electrodes 120 of the first touch sub-unit 51 and in the branch electrodes 120 of the second touch sub-unit 52 may have different directions. Therefore, when etching the fractures, there may be differences in the angles and directions of the fracture inclined surfaces formed on the metal mesh lines. When the angles and directions of the fracture inclined surfaces are different, there may be certain differences in the light output amount at some angles, avoiding the possibility of the user observing the fractures because of the regular arrangement. Although when observing the touch panel at a certain angle, the angles and directions of the fracture inclined surfaces of the metal mesh lines are different and the light output amount is different, the fractures may not only reflect light at one angle, such that the total light output amount at each angle may be consistent. Even when the extending directions of the branch electrodes 120 of the first touch sub-unit 51 and the branch electrodes 120 of the second touch sub-unit 52 in the touch electrode are different, the total light output when each touch electrode 10 reflects light may not be affected and there may be no brightness difference between the touch sub-units in the touch electrode 10.

Figure 22:
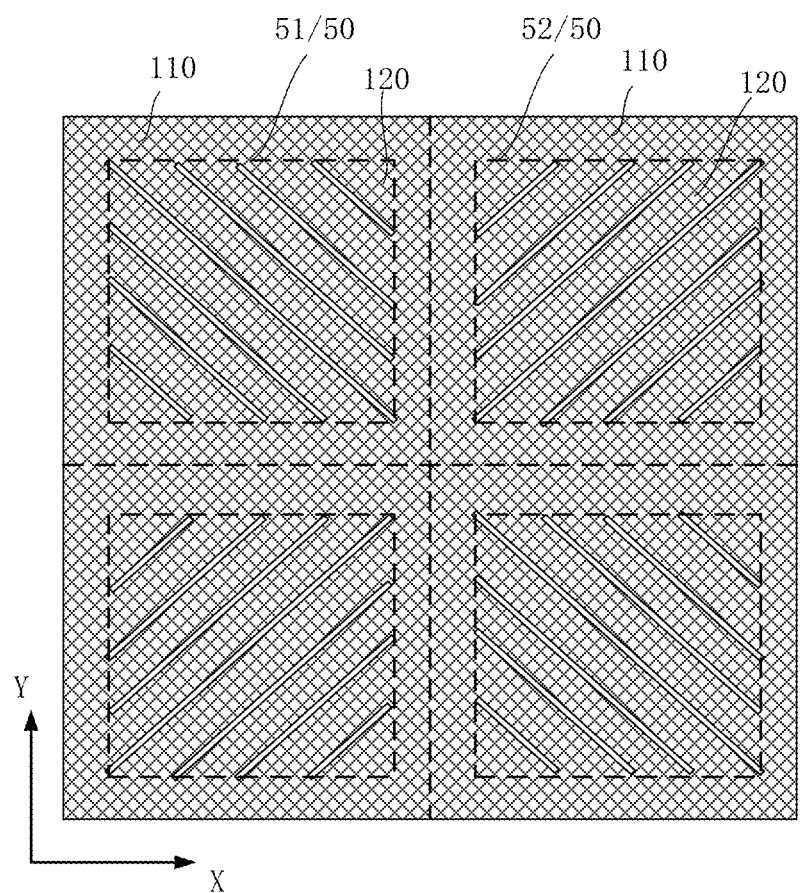
FIG. 22 illustrates another exemplary type of touch electrodes consistent with various disclosed embodiments in the present disclosure.

In some embodiments shown in FIG. 22 which is a structural schematic of another touch electrode, FIG. 22 shows one touch electrode. The touch electrode may include four touch sub-units 50, namely, two first touch sub-units 51 and two second touch sub-units 52. The X direction may be perpendicular to the Y direction. One first touch sub-unit 51 may include a plurality of branch electrodes 120, and the extending direction of each branch electrode 120 in the first touch sub-unit 51 may intersect the X direction. One second touch sub-unit 52 may also include a plurality of branch electrodes 120, and the extending direction of each branch electrode 120 in the second touch sub-unit 52 may intersect with the X direction. The branch electrodes 120 of the first touch sub-unit 51 and the branch electrodes 120 of the second touch sub-unit 52 may extend in different directions. Similar effects may be also achieved.

In some other embodiments, the touch electrode may include a plurality of touch sub-units, and the branch electrodes in each touch sub-unit may extend in different directions, or the branch electrodes in some touch sub-units may extend in different directions, or some branch electrodes in each touch sub-unit may extend in different directions, or some branch electrodes in some touch sub-units may extend in different directions.

The embodiments of the present disclosure do not limit the number, shapes, positions, sizes, etc. of the first touch sub-units and the second touch sub-units in the touch electrode; nor do they limit the numbers, shapes, positions, sizes, etc. of the main electrodes and the plurality of branch electrodes in each touch sub-unit. It may be set according to actual needs, and the above embodiments are only for illustrative purposes.

Figure 23:
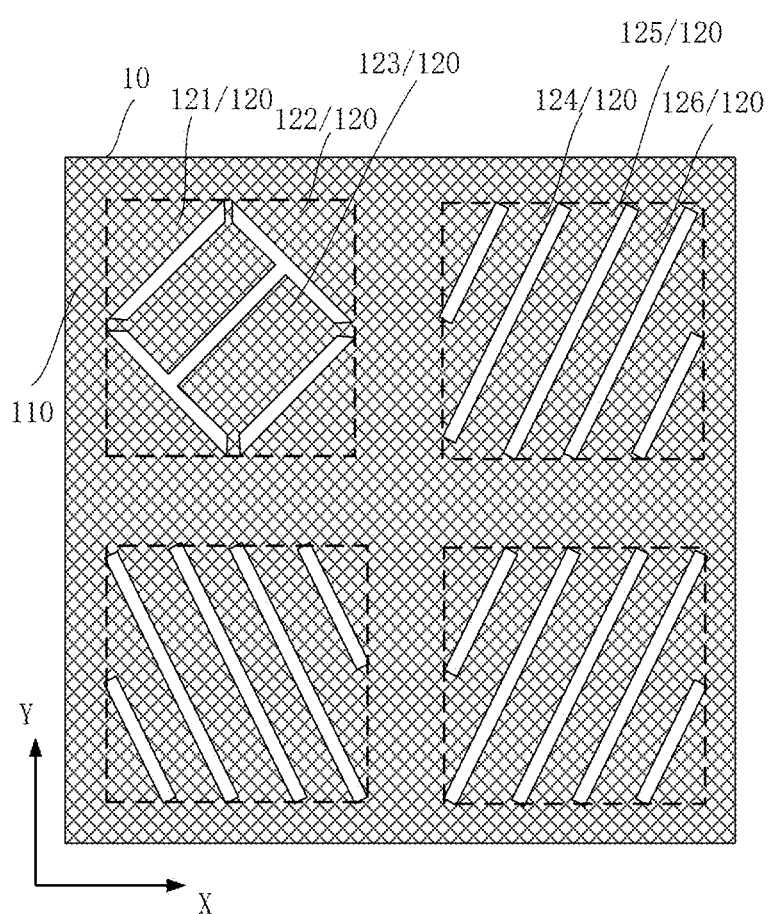
FIG. 23 illustrates a local structure of another exemplary touch panel consistent with various disclosed embodiments in the present disclosure.

In some embodiments shown in FIG. 23 which is a partial structure of the touch panel, at least a portion of the plurality of branch electrodes 120 in one touch electrode 10 may have different shapes.

Exemplarily, FIG. 23 shows one touch electrode 10, and the touch electrode 10 may include a main electrode 110 and a plurality of branch electrodes 120. For example, in one embodiment shown in FIG. 23, the touch electrode may include 24 branch electrodes 120, and at least some of the branch electrodes 120 in the touch electrode 10 may have different shapes. The following takes branch electrodes 121, 122, 123, 124, 125, and 126 as examples for description. The branch electrode 121 may have the same shape as the branch electrode 123, and the branch electrode 121 may have a different shape from the branch electrode 122. The branch electrode 124 may have a different shape from the branch electrode 125, and the branch electrode 125 may have the same shape as the branch electrode 126. The branch electrode 121 may be different from the branch electrode 124, the branch electrode 125, and the branch electrode 126. The branch electrode 122 and the branch electrode 123 may be both different from the branch electrode 124, the branch electrode 125, and the branch electrode 126. It should be noted that the term "same" here refers to the same within a certain range, and does not refer to complete consistency. This structure may be also used to avoid the regular arrangement of the branch electrodes of the touch electrode. At least some of the branch electrodes 120 in the touch electrode 10 have different shapes, such that there will be some branch electrodes 120 with different fracture directions. When etching the fractures, the angles and directions of the fracture inclined surface formed by the metal mesh lines may be different. The light output at different angles may be also different, which avoids the possibility of the user observing the fractures due to the regular arrangement.

The position of the branch electrode in the oval frame in FIG. 23 may need to be electrically connected to the main electrode to ensure that the touch electrode is in a conductive state. In some other implementations, when setting the branch electrodes, it should also be ensured that the branch electrodes are electrically connected to the main electrode.

Figure 24:
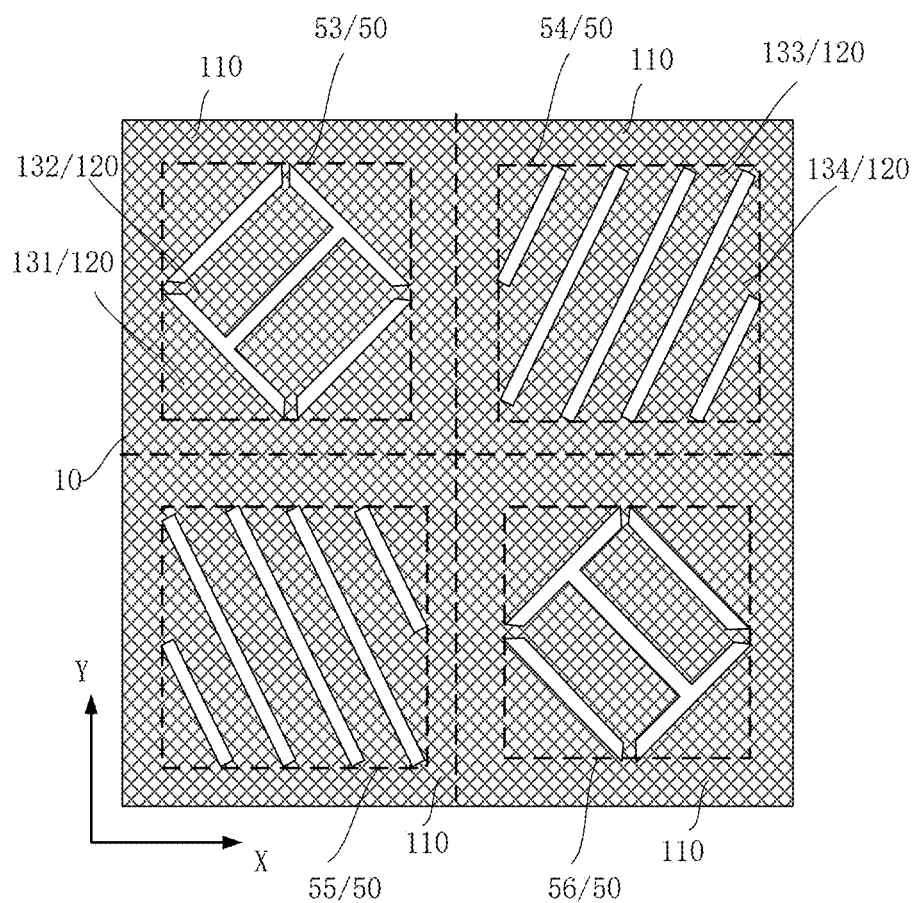
FIG. 24 illustrates another exemplary type of touch electrodes consistent with various disclosed embodiments in the present disclosure.

In some other embodiments shown in FIG. 24 which is a schematic diagram of the structure of another touch electrode, the touch electrode 10 may include a plurality of touch sub-units 50, and each touch sub-unit 50 may include a main electrode 110 and a plurality of branch electrodes 120 separated from each other. The plurality of branch electrodes 120 in one same touch sub-unit 50 may be all electrically connected to the main electrode 110 in the touch sub-unit 50; and the adjacent touch sub-units 50 in one same touch electrode 10 may be electrically connected through the corresponding main electrodes 110. At least some of the branch electrodes 120 in at least some of the touch sub-units 50 may have different shapes.

Exemplarily, FIG. 24 shows one touch electrode 10, and the touch electrode may include four touch sub-units 50. At least some of the branch electrodes 120 in at least some of the touch sub-units 50 may have different shapes. The touch sub-unit 53 may include a branch electrode 131 and a branch electrode 132, and the touch sub-unit 54 may include a branch electrode 133 and a branch electrode 134. The branch electrodes 131, 132, 133, and 134 may have different shapes. The branch electrodes in the touch subunit 55 and the touch subunit 56 may be also different in shape from the branch electrodes in the above-mentioned touch subunits.

In some embodiments, the shapes of all the branch electrodes 120 in the four touch subunits may be different, which may better break the regular arrangement of the branch electrodes and avoid the regular arrangement of the fractures. Therefore, the visibility of the fracture positions to the human eye may be reduced.

In some other embodiments, in the four touch subunits, the shapes of the branch electrodes 120 of some touch subunits may be different, and the shapes of the branch electrodes 120 of the other touch subunits may be the same or there may be some electrodes 120 with different shapes. This embodiment is relatively easy in the preparation process.

It should be noted that the shapes of at least some of the branch electrodes in the touch electrode being different may include a variety of possibilities, all of which are used to reduce the visibility caused by the regular arrangement of the branch electrodes through the irregular arrangement of the branch electrodes, and reduce the visual brightness difference caused by the touch panel. Therefore, the embodiment of the present disclosure does not limit the shapes of the branch electrodes, nor does it limit the irregular arrangement method, which may be selected according to actual needs.

Figure 25:
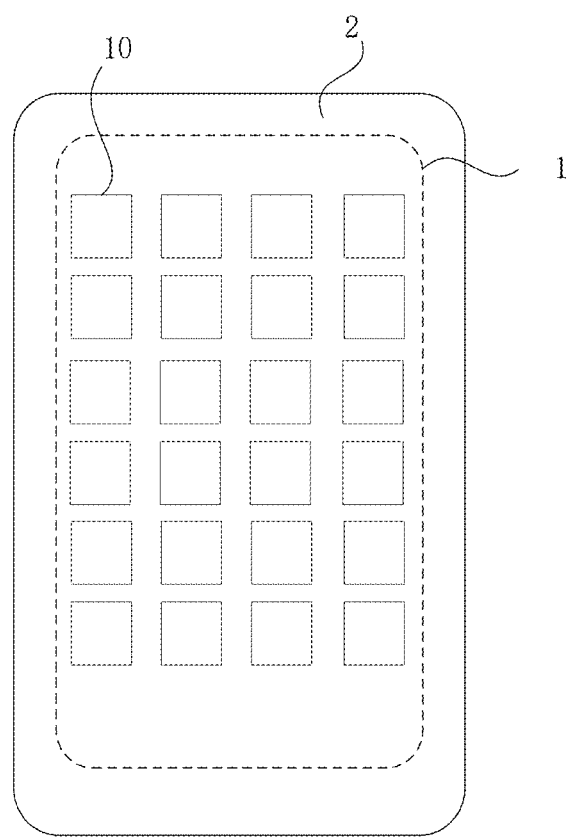
FIG. 25 illustrates an exemplary display device consistent with various disclosed embodiments in the present disclosure.

The present disclosure also provides a display device. As shown in FIG. 25 which illustrates an exemplary display device, in one embodiment, the display device 2 may include a touch panel provided by various embodiments of the present disclosure. The touch panel 1 may include a plurality of touch electrodes 10 arranged in an array. Touch leads, control chips and circuit structures are not shown in FIG. 25. The display device provided by the present disclosure may have technical characteristics of the touch panel provided by various embodiments of the present disclosure, and may achieve benefits of the touch panel provided by various embodiments of the present disclosure. For the details, the references may be made to the previous description about the touch panel embodiments.

Figure 26:
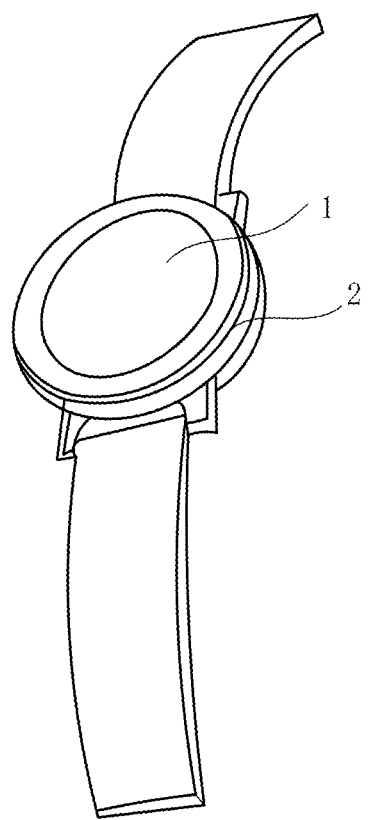
FIG. 26 illustrates another exemplary display device consistent with various disclosed embodiments in the present disclosure.

In another embodiment shown in FIG. 26 which illustrates another exemplary display device, the display device 2 may be a touch watch. The display device 2 may include a touch panel provided by various embodiments of the present disclosure. A user may perform touch operation on the watch, to send instruction requirements.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A touch panel, comprising a plurality of touch electrodes arranged in an array, wherein:
   the plurality of touch electrodes has a metal mesh structure including a plurality of metal mesh lines, an intersection being formed by two metal lines of the plurality of metal mesh lines;
   one touch electrode of the plurality of touch electrodes includes a main electrode and a plurality of branch electrodes, wherein the plurality of branch electrodes is separated from each other and all electrically connected to the main electrode;
   a minimum distance between two adjacent parallel metal mesh lines is L;
   a gap is formed between adjacent branch electrodes, the gap extending in an extension direction of the adjacent branch electrodes;
   a distance between adjacent branch electrodes in the touch electrode is D, wherein D<L; and
   the distance D is a distance between a first intersection formed by two metal mesh lines closest to a side fracture on a first side of the gap and a second intersection formed by two metal mesh lines closest to a side fracture on the second side of the gap along a direction perpendicular to the extension direction of the adjacent branch electrode.

2. The touch panel according to claim 1, further including touch leads, wherein:
   the touch leads are located between adjacent touch electrodes of the plurality of touch electrodes;
   the touch leads include metal mesh lines; and
   the touch leads are electrically connected to the plurality of touch electrodes in a one-to-one correspondence.

3. The touch panel according to claim 2, wherein:
   the plurality of touch electrodes and the touch leads are disposed in a same layer.

4. The touch panel according to claim 1, further including virtual electrodes, wherein:
the virtual electrodes are located between adjacent touch electrodes of the plurality of touch electrodes; and
the virtual electrodes include metal mesh lines.

5. The touch panel according to claim 2, further including virtual electrodes, wherein:
the virtual electrodes are located between the plurality of touch electrodes and the touch leads; and
the virtual electrodes include metal mesh lines.

6. The touch panel according to claim 5, wherein:
a width of the virtual electrodes along a direction perpendicular to an extending direction of the virtual electrodes is W1, and a width of the touch leads along a direction perpendicular to an extending direction of the touch leads is W2, wherein $0.8*W2 \leq W1 \leq 1.2*W2$.

7. The touch panel according to claim 2, wherein:
a width of the branch electrodes along a direction perpendicular to an extending direction of the branch electrodes is W3, and a width of the touch leads along a direction perpendicular to an extending direction of the touch leads is W2, wherein $0.8*W2 \leq W3 \leq 1.2*W2$.

8. The touch panel according to claim 2, wherein:
adjacent branch electrodes of the plurality of branch electrode in one touch electrode of the plurality of touch electrodes, the plurality of touch electrodes and the touch leads, and adjacent touch leads are all separated by metal mesh line fractures; and
a density of the metal mesh line fractures within a unit pixel area in the plurality of touch electrodes is the same as a density of the metal mesh line fractures within a unit pixel area at gaps between adjacent touch electrodes of the plurality of touch electrodes.

9. The touch panel according to claim 1, wherein:
the plurality of branch electrodes in the touch electrode is located in an area surrounded by the main electrode.

10. The touch panel according to claim 1, wherein:
the main electrode includes at least one mesh structure formed by metal mesh lines along a direction perpendicular to an extending direction of the main electrode, and includes a plurality of mesh structures formed by metal mesh lines along the extending direction of the main electrode; and/or
one branch electrode of the plurality of branch electrodes includes at least one mesh structure formed by metal mesh lines along a direction perpendicular to an extending direction of the branch electrode, and includes a plurality of mesh structures formed by metal mesh lines along the extending direction of the branch electrode.

11. The touch panel according to claim 1, wherein:
each of the plurality of branch electrodes in the touch electrode has a same extending direction.

12. The touch panel according to claim 1, wherein:
an extending direction of gaps between adjacent touch electrodes of the plurality of touch electrodes includes a first direction and a second direction, and an extending direction of the plurality of branch electrodes is the first direction; wherein the first direction intersects with the second direction.

13. The touch panel according to claim 1, wherein:
the plurality of branch electrodes of adjacent touch electrodes of the plurality of touch electrodes has different extending direction.

14. The touch panel according to claim 1, wherein:
one touch electrode of the plurality of touch electrodes includes a plurality of touch sub-units;
each of the plurality of touch sub-units includes one main electrode and a plurality of branch electrodes separated from each other;
the plurality of branch electrodes in one same touch sub-unit is all electrically connected to the main electrode in the touch sub-unit; and
adjacent touch sub-units of the plurality of touch sub-units in one same touch control electrode are electrically connected through corresponding main electrodes.

15. The touch panel according to claim 14, wherein:
the plurality of touch sub-units includes first touch sub-units and second touch units; and
the plurality of branch electrodes in the first touch sub-units and the plurality of branch electrodes in the second touch sub-units have different extending direction.

16. The touch panel according to claim 1, wherein:
at least some of the plurality of branch electrodes in the touch electrode have different shapes.

17. A display device, comprising a touch panel, wherein:
the touch panel includes a plurality of touch electrodes arranged in an array;
the plurality of touch electrodes has a metal mesh structure including a plurality of metal mesh lines, an intersection being formed by two metal lines of the plurality of metal mesh lines;
one touch electrode of the plurality of touch electrodes includes a main electrode and a plurality of branch electrodes, wherein the plurality of branch electrodes is separated from each other and all electrically connected to the main electrode;
a minimum distance between two adjacent parallel metal mesh lines is L;
a gap is formed between adjacent branch electrodes, the gap extending in an extension direction of the adjacent branch electrodes;
a distance between adjacent branch electrodes in the touch electrode is D, wherein D<L; and
the distance D is a distance between a first intersection formed by two metal mesh lines closest to a side fracture on a first side of the gap and a second intersection formed by two metal mesh lines closest to a side fracture on the second side of the gap along a direction perpendicular to the extension direction of the adjacent branch electrode.

18. A touch panel, comprising a plurality of touch electrodes arranged in an array, touch leads and virtual electrodes,
wherein:
the plurality of touch electrodes has a metal mesh structure;
one touch electrode of the plurality of touch electrodes includes a main electrode and a plurality of branch electrodes, wherein the plurality of branch electrodes is separated from each other and all electrically connected to the main electrode;
a minimum distance between two adjacent parallel metal mesh lines is L;
a distance between adjacent branch electrodes in the touch electrode is D, wherein D<L; and
the virtual electrodes are located between the plurality of touch electrodes and the touch leads.

* * * * *